Patented Sept. 14, 1954

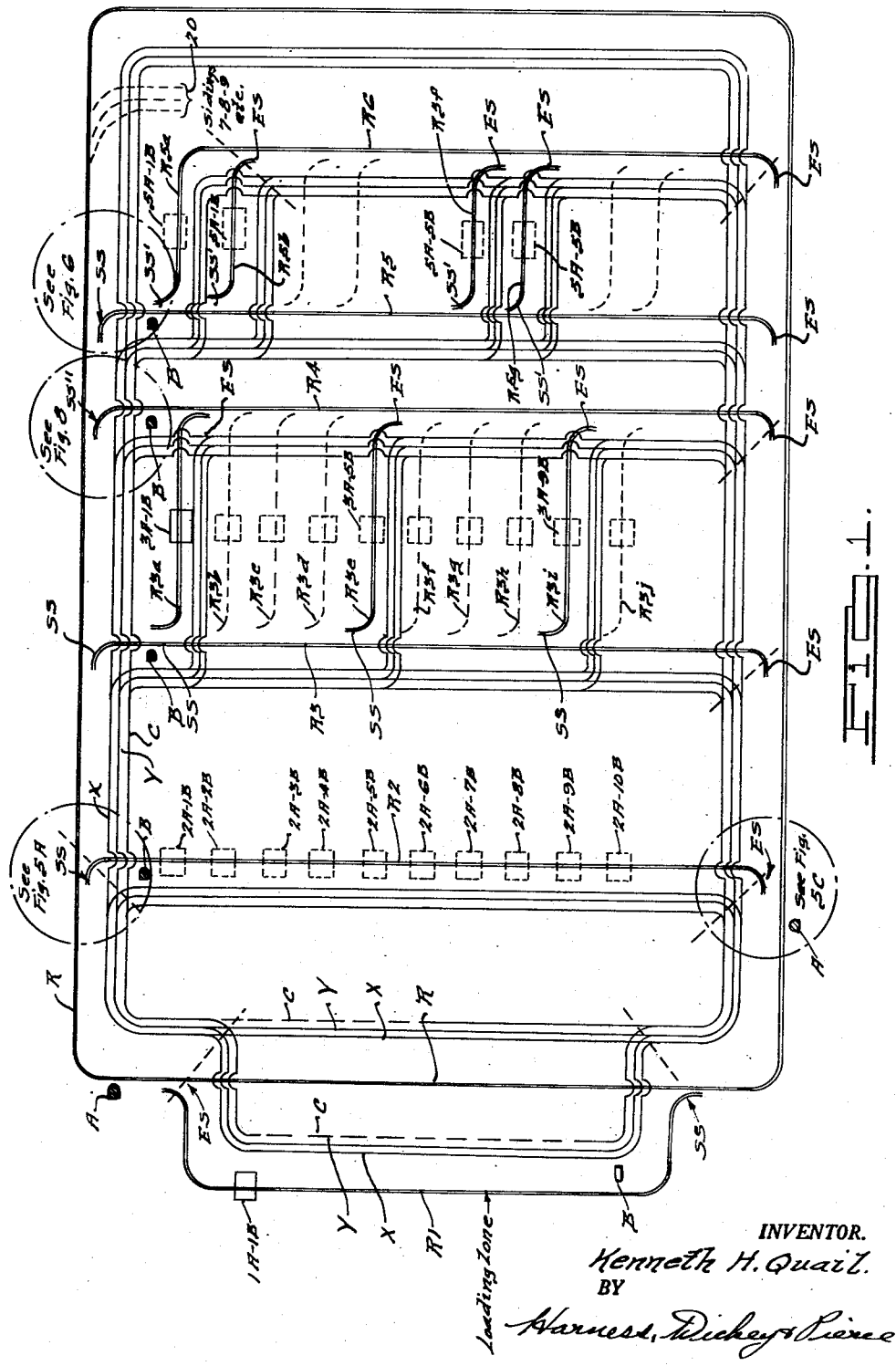

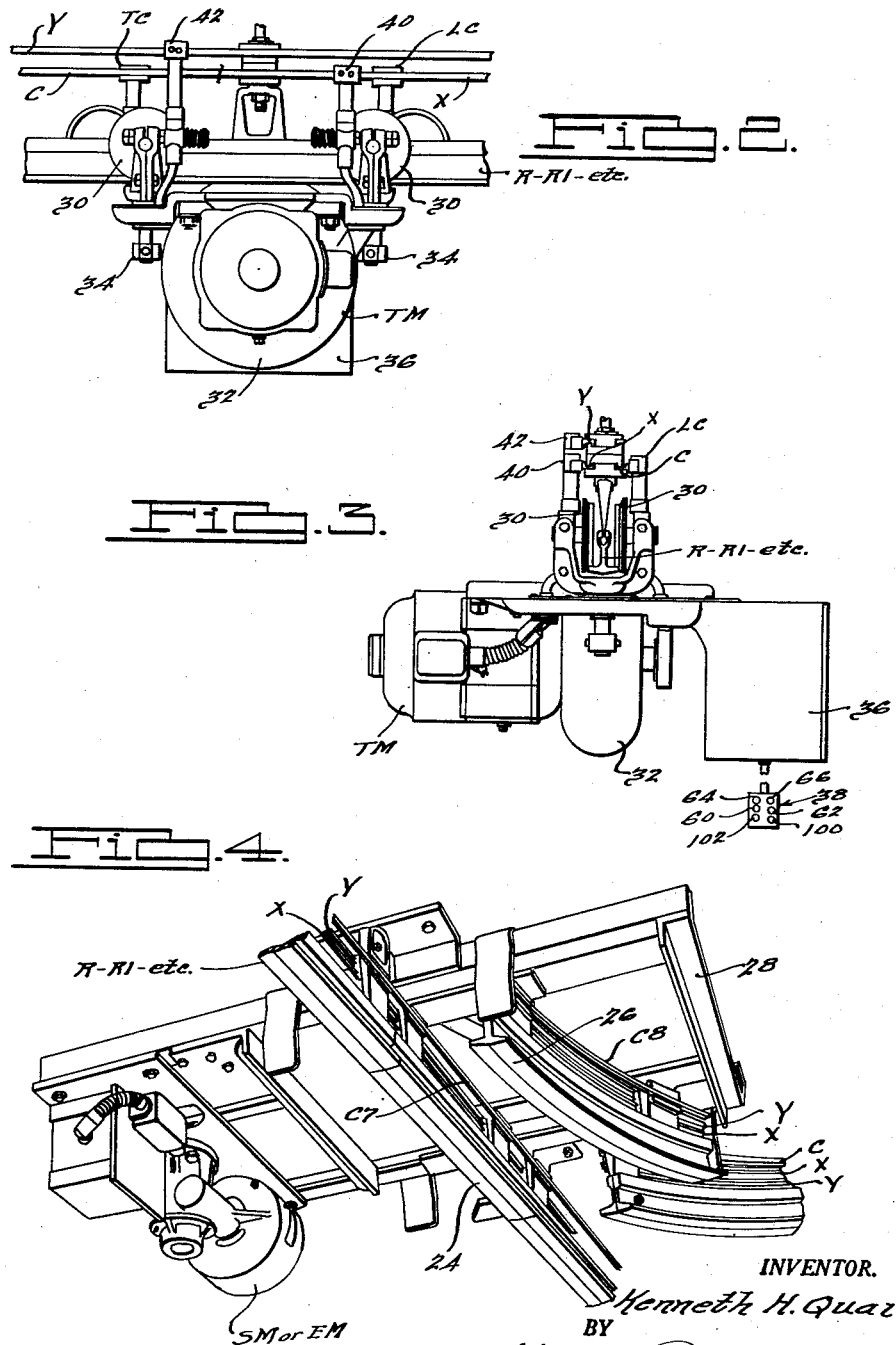

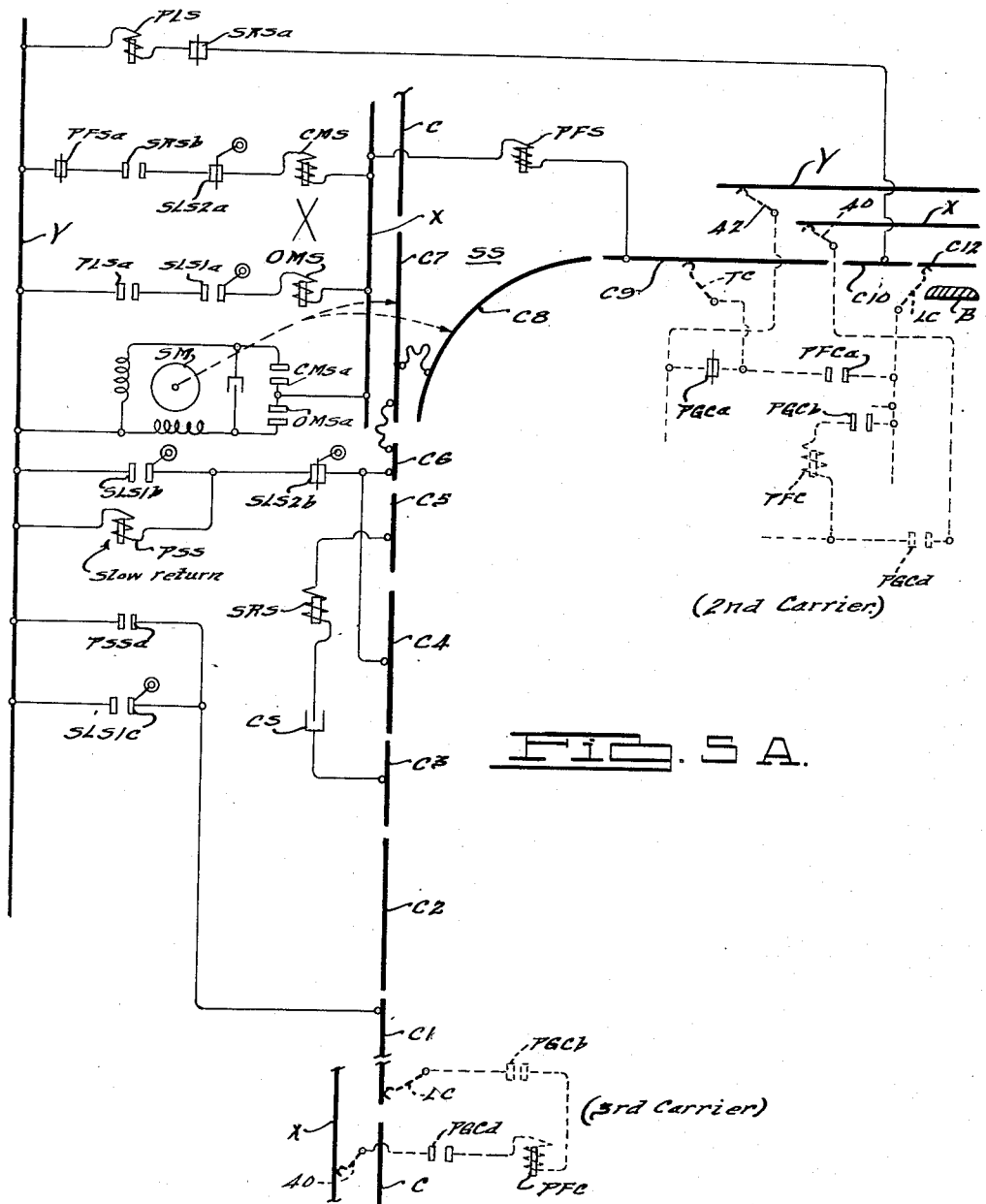

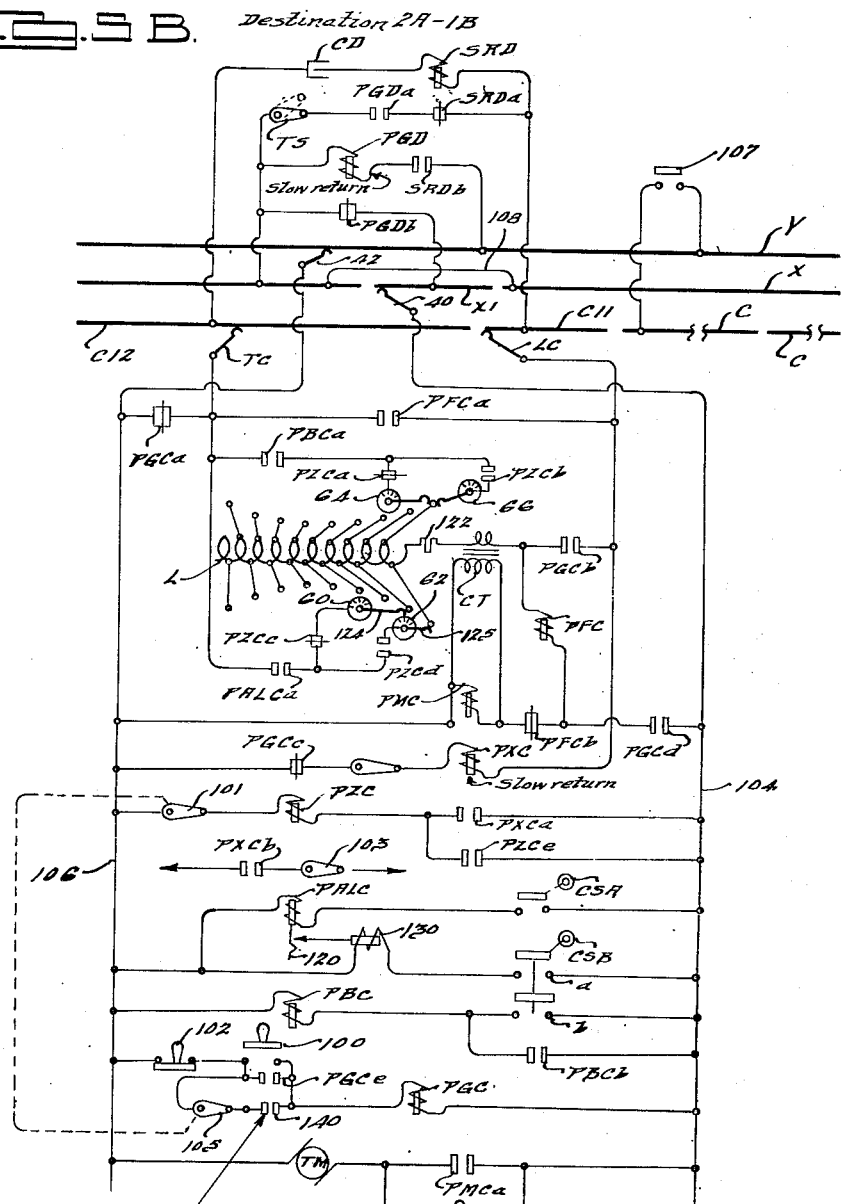
Sept. 14, 1954  K. H. QUAIL  2,688,934
ELECTRIC CONTROL MEANS FOR AUTOMATIC CONVEYER SYSTEMS
Filed Nov. 8, 1945  9 Sheets-Sheet 4

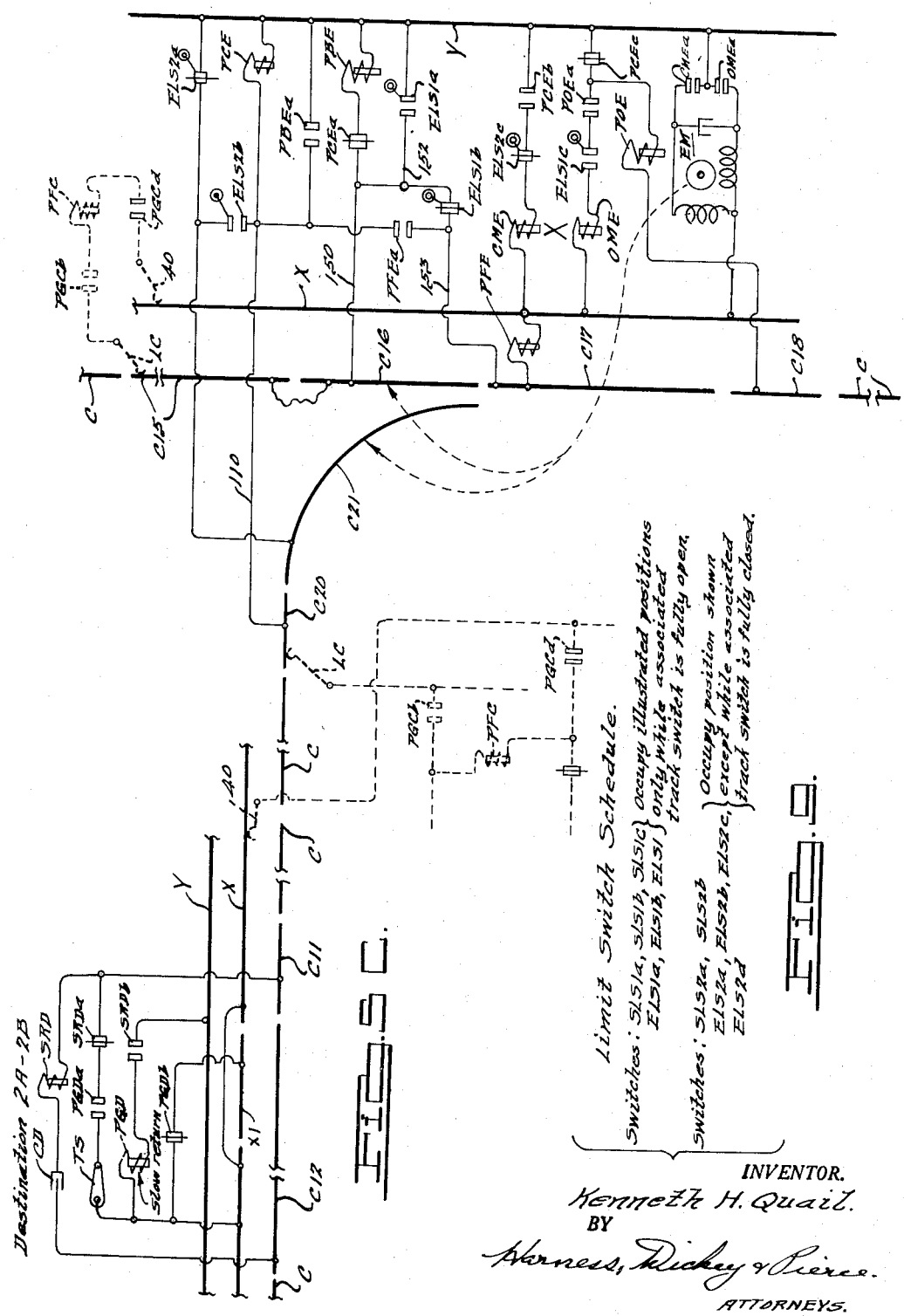

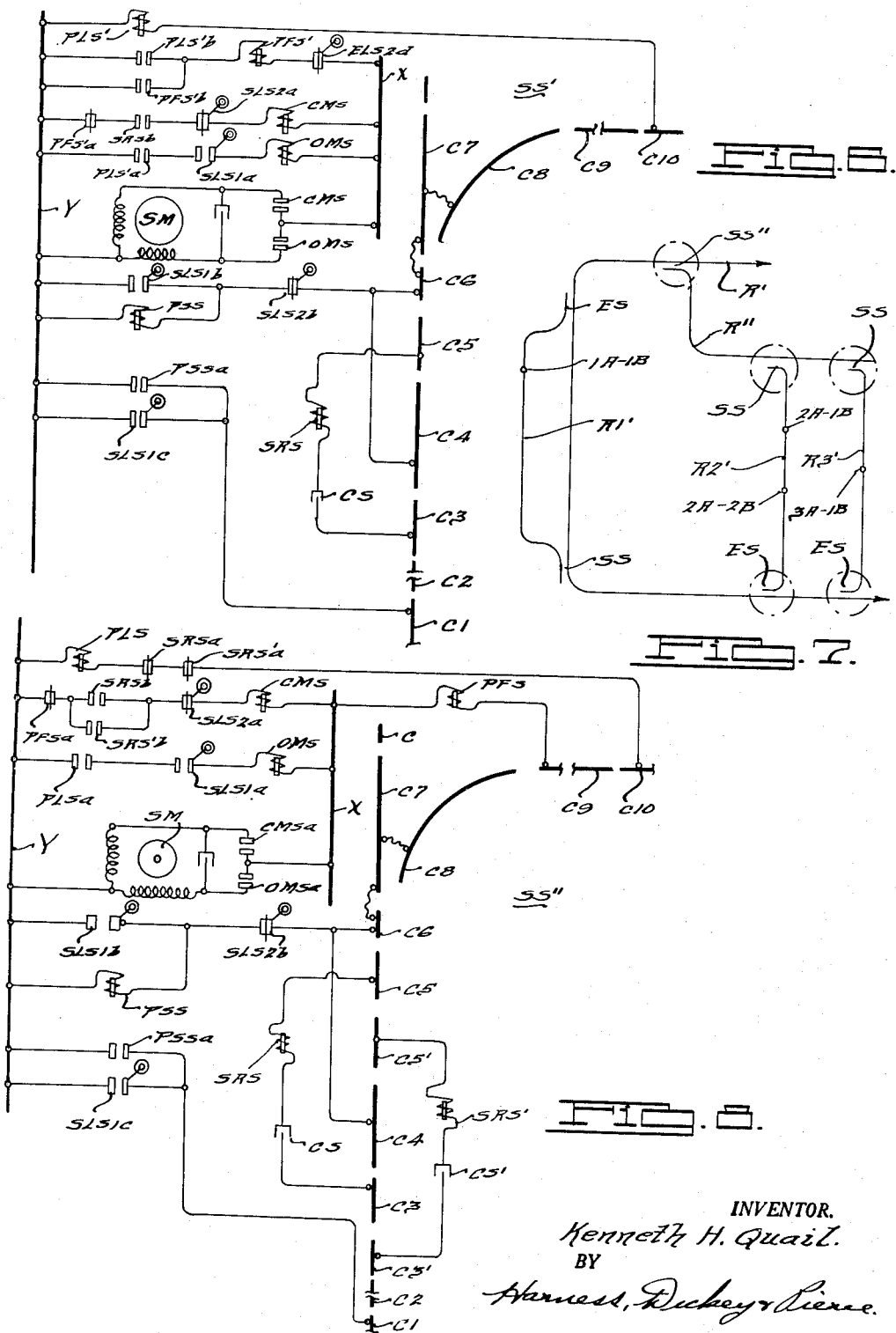

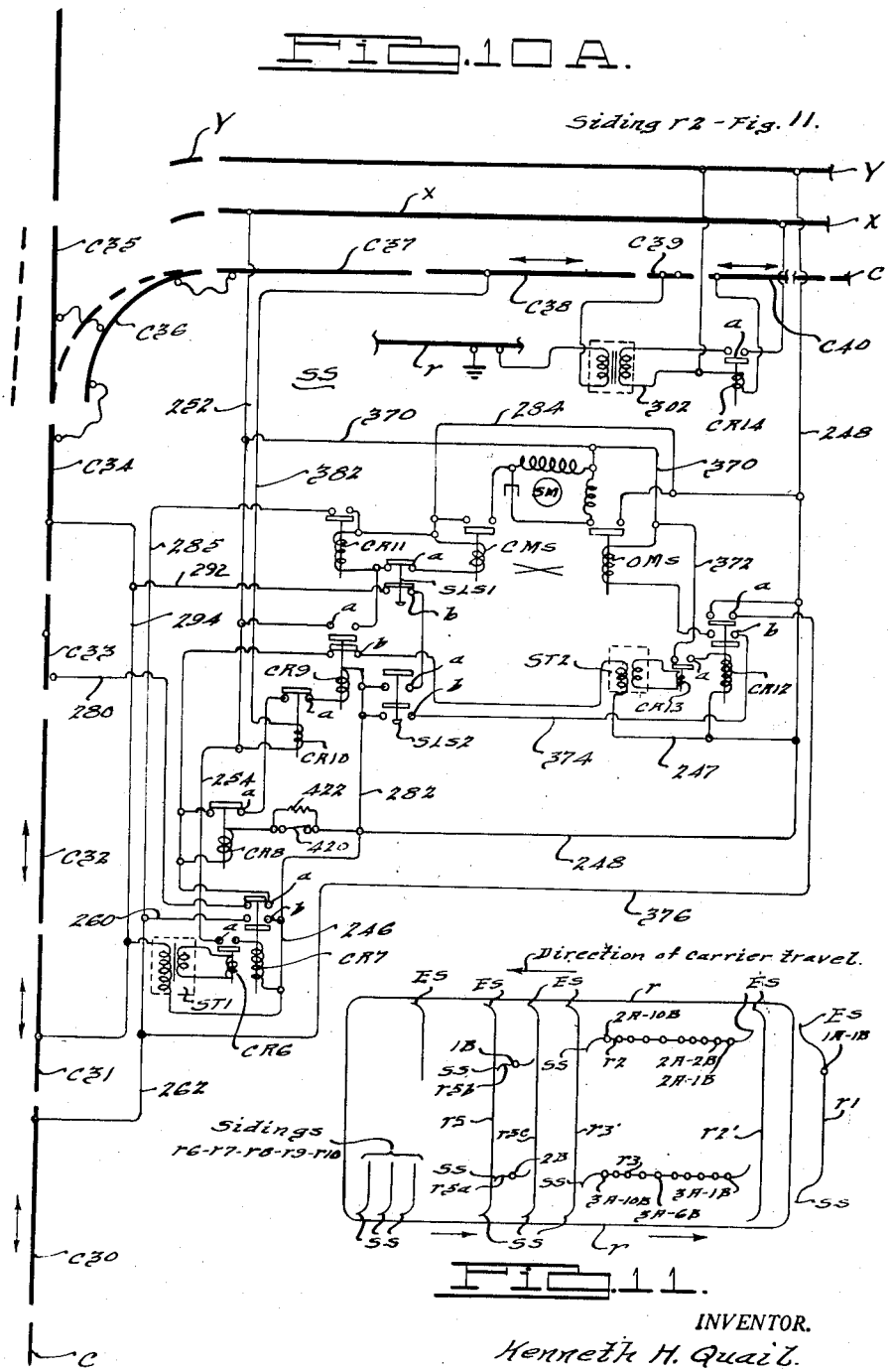

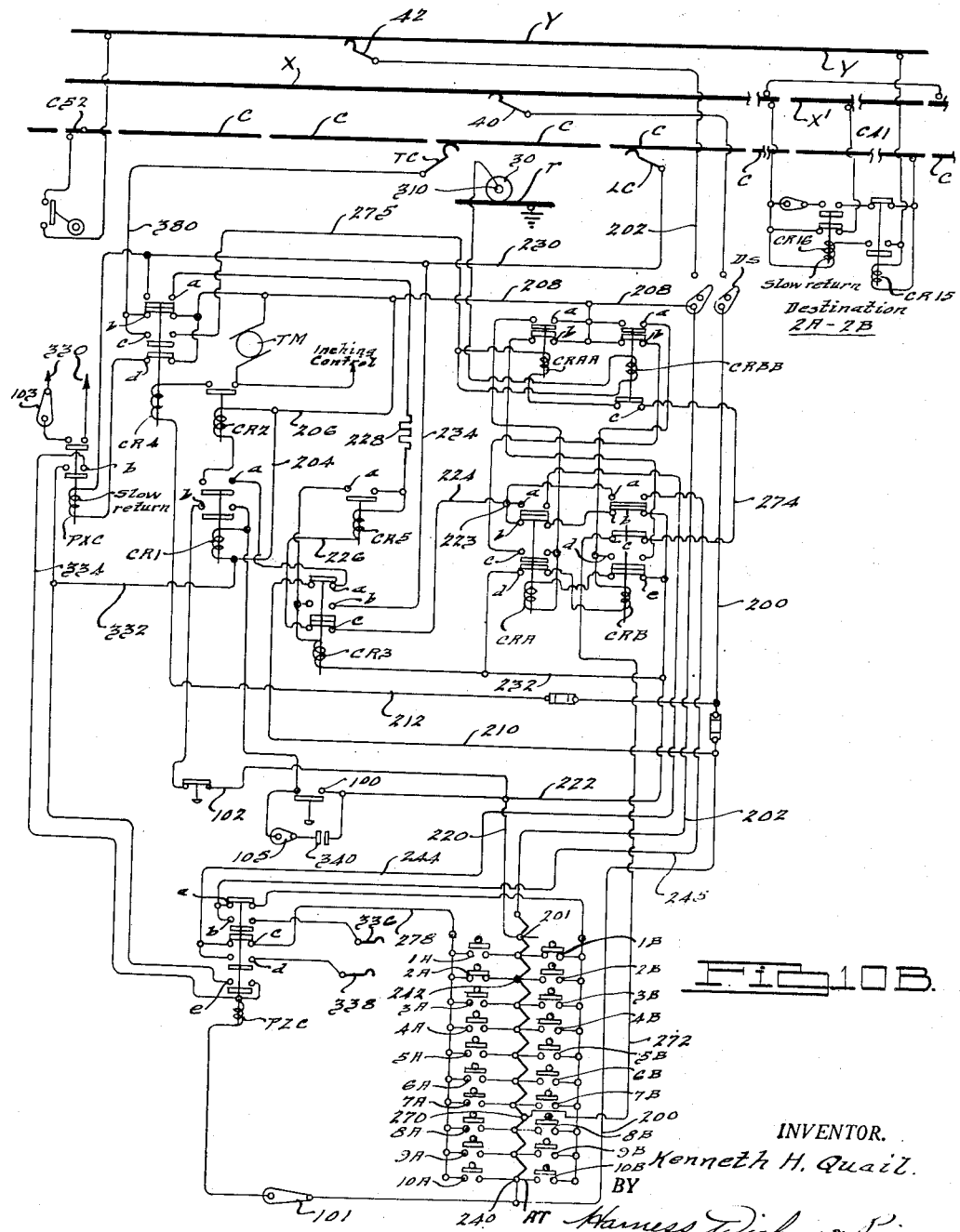

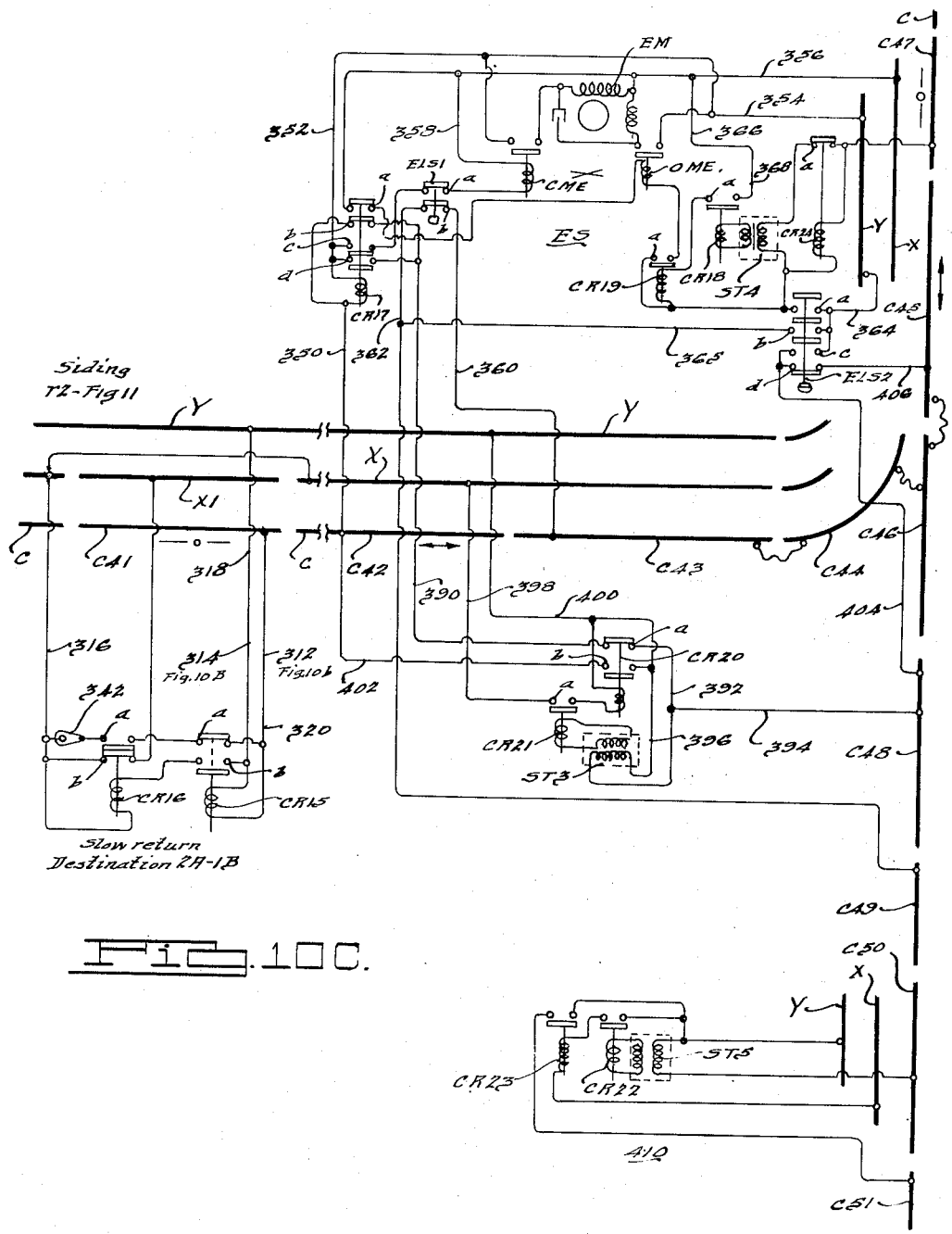

2,688,934

UNITED STATES PATENT OFFICE 2,688,934

ELECTRIC CONTROL MEANS FOR AUTOMATIC CONVEYER SYSTEMS

Kenneth H. Quail, Pleasant Ridge, Mich., assignor, by mesne assignments, to Mechanical Handling Systems, Inc., Detroit, Mich., a corporation of Michigan Application November 8, 1945, Serial No. 627,462

10 Claims. (Cl. 104—88)

The present invention relates to automatically controlled despatching systems and is more particularly directed to the provision of improved electrical control arrangements for use in connection with such systems.

It will be appreciated from a complete understanding of the present invention, that, in a generic sense, the improvements thereof are applicable to a wide variety of systems in which an instrumentality is required to be despatched to any of a variety of positions along any of a variety of different paths or routes. Examples of such systems, in the carrier field, include surface railways, overhead railways, and the like.

At the present time, a preferred application of the invention is in connection with overhead monorail systems of the general type which, in recent years, have been used to an increasingly large extent in factories to handle the distribution of materials and products as an incident to manufacturing, storage, and shipping operations. By way of illustration, but not of limitation, accordingly, the invention is so disclosed herein.

It will be understood that overhead carrier systems of the above indicated type may comprise a wide variety of track or monorail arrangements. Usually, of course, such monorail systems involve a main line and a plurality of branch lines or sidings, which are connected to the main line by way of siding switches and exit switches. Destinations or stopping points may be variously distributed round the monorail system, being usually located on the sidings, so as to permit unobstructed travel of carriers on the main line. Individual sidings may be provided with one or more destinations distributed along the length thereof.

For a number of years there has been a decided need for a simple, economically manufactured and installed control system, for carrier systems of the above type, which incorporates means whereby any one of a plurality of carriers, operable upon the system, can be despatched from any destination on the system, to any other destination on the system, the arrangement being such that in traveling from the dispatching point to the destination, the dispatched carrier may be caused to automatically operate such track switches as are needed to direct it to the siding on which the destination is located, and the arrangement being further such that individual carriers may, under appropriate conditions, be controlled by carriers ahead of them on the system, so as to avoid directing a carrier to a siding which is not in condition to receive it, and so as to avoid interference between the respective carriers at the various track switches or elsewhere upon the system. So far as the present applicant is aware, no systems have heretofore been provided which satisfactorily meet the foregoing generally stated requirements.

With the foregoing considerations in view, accordingly, principal objects of the present invention are to provide an automatically controlled despatching system which, generically, may be characterized as one in which any one of a plurality of instrumentalities operating along a system of routes may be despatched from any destination thereon to any other destination; to provide such a system for track guided carriers, wherein individual carriers, so despatched, are caused to operate such track switches as are necessary to enable them to enter the siding or sidings corresponding to the desired destination; to provide such systems wherein each track switch and each destination is provided with electrical apparatus which, under appropriate conditions, responds to the approach of a carrier to cause that carrier to actuate a particular switch, or to be stopped or otherwise controlled at a particular destination; to provide such systems wherein each carrier is provided with presettable electrical control apparatus, carried thereon, which is arranged to be automatically coupled to the electrical apparatus at the respective track switches and at the destinations, so as to provide the aforesaid control; to provide such systems wherein the apparatus on each carrier is arranged to be energized, in accordance with any of a plurality of different electrical conditions, corresponding respectively to the selected destination, and wherein the control apparatus at the various switches and at the various destinations are selectively responsive to such different electrical conditions; to provide such systems wherein, independently of the number of destinations and the number of track switches which are to be operated by a particular carrier, each carrier requires only a pair of control current collectors, wherein further the only control connections extending between the respective destinations is a single sectionalized control bus which, along with the usual power buses, may be carried directly by the overhead track or monorail; and to provide such systems embodying improved means for preventing interference between successive carriers on the main line or on sidings, and to prevent the entrance of carriers on to sidings which are not in shape to receive them.

With the above as well as other and, in certain cases, more detailed objects in view, preferred but illustrative embodiments of the invention are shown in the accompanying drawings, throughout the several views of which corresponding reference characters are used to designate corresponding parts and in which:

Figure 1 is a diagrammatic layout of an automatically controlled overhead monorail system embodying the invention;

Figure 2 is a view in side elevation of a tractor unit with which each carrier, operating upon the system of Figure 1, may be provided;

Figure 3 is a view in front elevation, of the tractor unit of Figure 2;

Figure 4 is a view in perspective of a conventional track switch construction, which may be utilized in connection with both the siding switches and the exit switches, which switches are diagrammatically shown in Figures 1, 5A, 5B, and 5C, 6 and 8;

Figures 5A, 5B, and 5C, collectively, diagrammatically illustrate, with reference to the system of Fig. 1, the control apparatus that is provided at certain of the siding switches, the control apparatus that is provided at each destination, the control apparatus that is provided at each exit, and the control apparatus which is preferably provided on each carrier in the system. In reading Figures 5A, 5B, and 5C, the sheet containing Figure 5B may be placed immediately to the right of the sheet containing Figure 5A, and the sheet containing Figure 5C, arranged endwise, should be placed immediately to the right of the sheet containing Figure 5B;

Figure 6 is a diagrammatic view of the control apparatus which, for a system as shown in Fig. 1, is provided at each siding switch, other than the siding switches which are arranged as shown in Figure 5A;

Figure 7 is an outline view of a slightly modified monorail of track system;

Figure 8 is a diagrammatic view of control apparatus which may be provided at certain of the siding switches of Figure 7;

Figure 9 is a schedule of the operating characteristics of the various limit switches which are operated by the track switches;

Figures 10A, 10B, and 10C, collectively, diagrammatically illustrate a modification of the invention, the control apparatus provided at each siding switch being shown in Fig. 10A, the control apparatus that is provided on each carrier being shown in Fig. 10B, and the control apparatus that is provided at each exit switch being shown in Fig. 10C. Additionally, Fig. 10C illustrates the control apparatus that is provided at each destination, and also illustrates auxiliary control apparatus which may be distributed throughout the system to maintain a desired spacing between carriers. If, in reading Figs. 10A, 10B, and 10C, the sheet containing Fig. 10B is placed immediately to the right and aligned with the sheet containing Fig. 10A, and the sheet containing Fig. 10C is placed to the right and somewhat higher than the sheet containing Fig. 10B, the three sheets collectively illustrate two sections of main line which are interconnected by a siding; and Figure 11 is an outline view of a track layout to which the system of Figures 10A, 10B, and 10C is applicable.

Referring first to the embodiment of Figures 1 through 6, the illustrative monorail or track system (Figure 1) comprises an ovehead track, the main track R whereof is arranged in a continuous loop. The track system also comprises a plurality of sidings R1, R2, R3, R4, R5, and R6. As illustrated, siding R1 contains only a single destination 1A—1B, and as an example, such siding may be used as a loading or storage zone, on which a plurality of carriers may be positioned. The destination 1A—1B might, for example, serve as a principal dispatching station.

The siding R2 is illustrated as containing a plurality of successive destinations 2A—1B through 2A—10B, the character 2A indicating the second siding, and the characters 1B, 2B, etc., indicating the position of the respective destinations along the siding.

The sidings R3 and R4 are interconnected by a series of sidings (R3a–R3j) each having only a single destination individual thereto, said destinations being designated 3A—1B through 3A—10B. As before, the destination characters 3A indicate that the destination is one which must be reached by entering siding R3, whereas the characters 1B, etc., correspond to the individual subordinate sidings and the destinations thereon.

Sidings R5 and R6 are interconnected by a plurality of subordinate sidings, each also containing only a single destination.

As is indicated by the dotted lines 20 as many additional sidings as may be desired may be associated with the main track R, a feature of the present system being that a virtually unlimited number of sidings and stations may be provided without any material alteration in the control system.

A siding switch is provided at the junction between the entering end of each main or subordinate siding and the track from which it branches and such siding switches and their associated controllers are designated SS and SS'. Similarly, an exit switch is provided at the outgoing end of each siding in the system, all such exit switches and their associated controllers being identical and being designated ES.

The monorail may, of course, be variously constructed, and is illustrated in Figures 3 through 6 as being of usual T section. A plurality of spaced hangers serve to support the main monorail or track R. Structurally, the individual siding and exit switches may be of conventional construction, the difference between the controllers therefor being described below.

As appears most clearly in Figure 4, each switch may comprise a pair of rail sections 24 and 26, which are supported upon a motor driven slide 28. The slide 28 for each siding switch is adapted to be moved between its two operative positions by a motor SM (Figure 4) and the slide 28 forming part of each exit switch is adapted to be moved between its two positions by means of a motor EM. Further in accordance with conventional practice, each switch structure may be provided with a plurality of limit switches (not shown in Figure 4), which are mechanically operated by the movements thereof. These limit switches are shown in Figures 5A, 5C, 6 and 8 and are discussed further below.

The individual carriers may, of course, be variously constructed depending upon the material to be handled thereby. As previously stated, these carriers are preferably of the electrically self-propelled type. Such carriers conventionally include a tractor unit and an illustration of such a unit is shown in Figures 2 and 3. In these figures, the tractor is supported upon the main rail R, by means of spaced pairs of rail wheels 30, which supportingly engage the flange of the associated monorail or track. Each tractor further comprises a driving motor designated TM in Figures 2, 3, and 5B. The driving connection between each motor TM and the rail, in the conventional type illustrated, comprises a pneumatic tired traction wheel 32, which frictionally engages the underside of the track. Each tractor unit is also provided with a plurality of supporting members 34, from which the particular carriage or body structure, associated with the tractor, may be suspended. Each tractor may also carry the carrier mounted control elements which are shown in Figure 5B, and, for this purpose, may be provided with a control cabinet 36. In accordance with the present invention, a push button station 38 may be flexibly supported from the cabinet 36, and the station 38, may, and preferably does, carry the manually operable control switches which are needed to make a destination selection and to control the starting of the individual tractor unit.

As illustrated, each tractor motor TM, is supplied with power, through usual spring biased current collectors 40 and 42, from bus bars X and Y which are carried by the previously mentioned hangers 22. Bus bars X and Y may be supplied with alternating current from any suitable source not shown, and it will be understood, of course, that if desired, multiphase arrangements may be used instead of the indicated single phase arrangement.

As is indicated diagrammatically in Figure 1, and in greater detail in Figures 5A, 5B, and 5C, the bus bars X and Y may and preferably do extend continuously along the monorail system. In the indicated system, bus bar Y is utilized as the return line, and all runs of this bus bar, on sidings and on the main track may be and preferably are electrically continuous. This continuity may be effected by providing flexible jumpers at the various switch points as will be appreciated. All runs of the supply bus X are also preferably electrically continuous, with the exception that, as shown in Figure 5B, the bux X is sectionalized in the region of each destination, all as described in more detail below.

An important feature of the present invention resides in the fact that only a single control bus bar or conductor C is required. As shown in Figure 3, the bus bar C is also carried by the hangers 22 and is disposed to be electrically engaged by a pair of longitudinally spaced current collectors LC and TC, the collector LC being hereinafter referred to as the leading control collector, and the collector TC being hereinafter referred to as the trailing control collector. The longitudinal spacing between the power collectors 40 and 42 is preferably substantially less than the spacing between the control collectors LC and TC. Moreover, the longitudinal spacing between the control collectors is preferably somewhat in excess of the overall length of the carrier.

Preferably, the control bus C is sectionalized throughout its length. The sectionalizing at siding switches, exit switches and at destinations is shown in detail in Figs. 5A, 5B, 5C, 6 and 8, in which figures the control bus sections are given the reference character C followed by a subscript number. Elsewhere than at switches and destinations, it is preferred that the control bus C be divided into a plurality of sections, each slightly shorter than the spacing between the control collectors LC and TC. All such short sections, which are diagrammatically shown in Fig. 1, bear the reference character C.

Referring to Figure 5A, the sectionalizing of the control bus in the region of each siding switch SS is such as to define a plurality of bus bar sections C1 through C7. Preferably but not necessarily, the spacing between the ends of adjacent sections C1 through C7, as well as the hereinafter described sections, is somewhat less than the length of each control collector LC and TC. As shown, sections C6 and C7 are jumpered together, it being understood that each section C7 is carried by and moves with the corresponding switch SS.

Also adjacent each siding switch, the control bus C which extends along the corresponding siding, is interrupted to define the three sections C8, C9, and C10, section C8 being carried by the corresponding switch SS, and being jumpered to the previously mentioned switch C7.

As appears in Figure 5B, as well as in the left-hand portion of Figure 5C, the control bus C is also interrupted in the immediate region of each destination, to define a short stop control section C11. Each stop control section is preferably preceded by a relatively long section C12, the length whereof is determined by the distance, in advance of a destination, at which a carrier is stopped, it is desired to hold a following carrier. In the illustrated case, Fig. 5B, the destination A2—1B is relatively near the associated siding switch. Consequently, section C12 extends to section C10, as seen in Fig. 5A.

Figures 5A, 5B, and 5C specifically show two destinations, 2A—1B, and 2A—2B, being respectively the first and second destinations on the second siding R2 (Figure 1). Depending upon the distance between such destinations the section C11 for the first destination and the section C12 for the second destination, may be separated by one or a series of intervening sections C, two being shown in Fig. 5B. Similar comments apply to the sectionalizing between the remaining destinations on a particular siding. Also depending upon the spacing between the last destination on a particular siding and its exit switch, one or more sections C may intervene between the section C11 for such last destination and the first control section C20 associated with such switch.

In the region of each exit switch, the main track portion of the control bus bar C is interrupted to define the sections C15, C16, C17, and C18, and the siding portion of the control bus bar is sectionalized to define the sections C20, and C21, it being recognized that bus bar sections C16 and C21 are carried by and are moved by the corresponding exit switch ES.

In the description of operation, mention is made of those instances in which it is important that a particular bus bar section C1—C2—etc. have a particular length, and, though diagrammatic, the indicated lengths of the bus bar sections, in Figures 5A, 5B, and 5C are approximately to scale with respect to the indicated spacings between the control and power collectors, carried by the carrier. Unless otherwise stated, it may be assumed that the length of each bus bar section is somewhat less than the LC and TC spacing so that such collectors do not simultaneously engage the same section; and that the collectors LC and TC are long enough to bridge the gaps between successive sections.

The control apparatus for each siding and exit switch may be and preferably is located at or near such switch. Such apparatus for each siding switch SS, shown in Fig. 5A, comprises, in addition to the driving motor SM therefor, a pair of usual reversing contactors CMS and OMS, and a series of relays PLS, PFS, PSS, and SRS, all of which may be of conventional electromagnetically operated construction, the contacts whereof bear corresponding reference characters with the subscripts *a*, *b*, *c*, etc. These contacts occupy the illustrated positions when the corresponding coils are de-energized, and occupy opposite positions when and so long as the coils are energized. The siding switch controllers also include a plurality of usual limit switches SLS1*a*, SLS1*b*, SLS1*c*, and SLS2*a*, and SLS2*b*, all whereof are responsive to the movements of the corresponding siding switch SS, and occupy the closed and open positions under the conditions and at the times specified in the limit switch schedule given below.

Switch closing operations, to permit a carrier to pass from one track section to a branch section, are controlled primarily by the relay SRS forming part of each siding switch controller. Each such relay SRS is electrically connected between the two control bus bar sections C3 and C5, in series with a control capacitor Cs. In the embodiment now being described, the relays SRS and associated capacitors CS form parts of selective control circuits which are electrically connected to a carrier mounted source of power, represented as a control transformer CT, as seen in Fig. 5B, as the carrier approaches the corresponding siding switch. The thus completed selective control circuits contain impedance elements, the magnitudes whereof are variably determined in accordance with the destination selected, and the relation is such that as a carrier approaches a siding switch, which is required to be actuated, in order to enable the carrier to reach the selected destination, the thus completed control circuit approaches resonance to the control frequency. The individual relays SRS are proportioned to be actuated in response to the value of current which flows in such control circuits under the just-mentioned approximately resonant conditions, and the consequent operation of the corresponding relay SRS actuates the switch, all as is described in more detail below.

Each destination on the system may be and preferably is provided with control apparatus comprising a selectively responsive relay SRD, and a companion relay PGD. Each relay SRD is connected across sections C11 and C12 of the control bus bar, in series with a destination capacitor CD. Accordingly, as in the case of the selectively operable siding relays SRS, the destination relays SRD are operably responsive only to the approach of a carrier which is effective to complete an approximately resonant circuit, including the relay SRD. The relays PGD function as described below to stop the carriers and may also serve to institute a series of auxiliary control operations.

The control equipment at each exit switch, is shown in full lines in Figure 5C, and comprises in addition to the indicated limit switches ELS1*a*, ELS2*a*, etc. a series of control relays PCE, PBE, PFE, and POE, and a pair of reversing contactors CME and OME, associated with the motor EM which operates the exit switch.

The previously mentioned controller which is carried by each carrier, and may be and preferably is housed in the control box 36 (Figure 3) comprises a starting contactor PMC for the traction motor TM, a starting relay PGC, a protective relay PFC, selecting relays PALC and PBC, auxiliary relays PXC and PZC, and cam operated selecting switches CSA and CSB, see Fig. 5B. The cam operated switches CSA for all carriers are operable by cams A which, as shown in Figure 1, are distributed at various points throughout the system. Similarly the switches CSB for all carriers are disposed to be similarly operated by cams B which are distributed throughout the system.

In addition to the foregoing elements, the carrier mounted controllers each include a station selector which forms a part of the above mentioned selective control circuits and the setting of which determines whether a resonant circuit condition will be established as the carrier approaches the several siding switches and destinations. More particularly, and as shown, each station selector comprises, fundamentally, an inductance L, selectively different amounts whereof may be selectively adapted for connection to the previously mentioned tuned circuits as the corresponding carrier approaches the various siding switches and destinations.

It will be appreciated that, generally speaking, a plurality of "selecting" operations are involved in causing a carrier to move along the track system to a selected destination. In the instance illustrated by Figures 5A, 5B, and 5C, two such selecting operations are involved. The first selecting operation is one which conditions the carrier to so control the associated siding switch as to enable the carrier to pass therethrough on to the siding. Since such siding includes a plurality of destinations, the second selecting operation is one which conditions the carrier to stop at a selected one of such destinations to the exclusion of the other such destinations. Similarly, in dispatching a carrier to, for example, station 3A—1B associated with siding R3 (Figure 1), two selecting operations may be said to be involved. In this instance the first selecting operation conditions the carrier to operate the siding switch SS leading to siding R3. The second selecting operation conditions the carrier to operate the siding switch leading from siding R3 to the subordinate siding R3*a*. Since such subordinate siding contains only one destination, the same selection which causes the carrier to enter siding R3*a* may be used to cause the carrier to stop at such destination. It will be appreciated that if such a subordinate siding contained a plurality of destinations, an additional or third selection would be involved in determining at which of such destinations the carrier would be stopped. Other track and siding arrangements might require more than three selections to be made in causing a carrier to reach a selected destination. The system of Figs. 1 through 8 provides for two selections, whereas the system of Figs. 7 and 8 provides for more than two selections.

In accordance with the present invention, all manual operations needed to effect all selections necessary to cause a carrier to reach a selected destination may be made at the same time, and they may be made either before the carrier is started or while it is traveling along the track.

Preferably and as illustrated in Figs. 3 and 5B, each carrier is provided with a pair of dials 60 and 64, dial 60 serving generally to select the siding containing the desired destination, and dial 64 serving generally to make a selection between the individual destinations associated with a particular siding. In certain cases as in connection with sidings R3*a*, etc., as mentioned above, dial 64 may serve to make a siding selection as well as a destination selection. For convenience of description, however, dial 60 is hereinafter referred to as a siding selector and dial 64 is hereinafter referred to as a destination selector.

The dial 60 is provided with a plurality of different operative positions, in which the control finger 124 associated therewith serves to introduce correspondingly different amounts of the inductance L into the carrier mounted portion of the above described selective control circuit. Generally stated, the number of such different operating positions of the dial 60 corresponds to the number of individually responsive siding switches. Thus, if dial 60 is turned to its position corresponding to the siding switch leading to the siding R2 (Figure 1), it introduces into the selective control circuit sufficient of inductance L so that when such selective control circuit is completed as the carrier approaches such siding switch, a substantially resonant circuit condition is produced. Except as hereinafter noted, however, control circuits which are completed as the carrier approaches switches other than the "selected" switch are substantially removed from resonance, since the selected amount of the inductance L does not match the control condensers CS located at such other switches.

Similar comments apply to dial 64, which has operative positions corresponding in number to the maximum number of destinations on any one siding or to the maximum number of siding switches leading from a particular siding onto subordinate sidings. Each setting of dial 64 introduces a sufficient amount of inductance L into the carrier-mounted selective control circuit so that as the carrier approaches the selected destination (or subordinate siding switch) a resonant condition is produced. As the carrier approaches other destinations or other subordinate siding switches, resonant conditions are not produced.

In the embodiment of the invention now being described, the selecting dials 60 and 64 are selectively rendered effective and ineffective by the above-mentioned carrier-mounted, cam-actuated switches CSA and CSB, which switches respond, respectively, to cams A and B which are distributed along the track system. Cams A are so located around the system that the siding selector (dial 60) is rendered effective prior to the approach of the carrier to any siding switch which such carrier might need to operate in traveling from its starting point to a selected destination. The cams B are so located, in turn, that the destination selector (dial 64) is rendered effective between the time the carrier enters a particular siding and the time the carrier approaches the selected destination or corresponding subordinate siding. Locations for cams A and B which satisfy the above requirements are illustrated in Figure 1.

In many cases it is desired to have a carrier automatically return to a normally fixed, but selectable, starting position (such as destination 1A—1B, Figure 1) after having completed a trip to another destination. Dials 62 and 66 are provided for this purpose and co-operate with inductance L as described for dials 60 and 64. In Figures 5A, 5B, and 5C, dials 62 and 66 are set for the station 1A—1B.

In Figures 5A, 5B, 5C, 6, and 8, the various relay and contactor coils and contacts are shown separately from each other, so as to simplify the drawings. Coils and contacts bear identical reference characters with the exception that the subscripts a, b, etc., are added to the contacts.

The following "Relay and Contactor Schedule" identifies all contacts operated by a particular coil and indicates certain operating characteristics thereof. Moreover, the limit switches such as SLS1a, etc., are indicated in Figures 5, 6, and 8, as being structurally separate. The operating characteristics of these limit switches are specified in Fig. 9, and it will be understood that these limit switches may be conventionally constructed and may be conventionally mounted upon the switch structures shown in Figure 4. Similarly, the carrier mounted cam switches CSA and CSB may be normally open, momentary contact, switches, adapted to be closed only while engaged by the corresponding cams A and B.

*Relay and contactor schedule*

| Relay or Contactor | Normally Open Contacts | Normally Closed Contacts |
|---|---|---|
| OMS | OMSa | |
| CMS | CMSa | |
| OME | OMEa | |
| CME | CMEa | |
| PMC | PMCa | |
| PFS | | PFSa. |
| PFS' | PFS'b | PFS'a. |
| PFC | PFCa | PFCb. |
| PGC | PGCb, PGCd, PGCe | PGCa, PGCc. |
| PZC | PZCa, PZCc, PZCe | PZCb, PZCd. |
| PBC | PBCa, PBCb | |
| PFE | PFEa | |
| PALC | PALCa | |
| PXC | PXCa, PXCb | |
| PGD | PGDa | PGD. |
| PLS | PLSa | |
| PLS' | PLS'a, PLS'b | |
| PCE | PCEa, PCEb | PCEc. |
| POE | POEa | |
| PBE | PBEa | |
| PSS | PSSa | |
| SRS | SRSb | SRSa. |
| SRS' | SRS'b | SRS'a. |
| SRD | SRDb | SRDa. |

In the above schedule, relay PFC is low in impedance (for example, 5000 ohms) whereas relays PLS, PLS', PCE, POE, PBE and PSS are high in impedance (for example, 50,000 ohms). Any of the last mentioned relays will operate when connected in series with relay PFC across the buses X—Y, whereas, under such conditions relay PFC will not operate, since it requires substantially full X—Y voltage to operate it. Relays SRS, SRS' and SRD have the response characteristics described below in connection with the tuned circuits, and the other relays and contactors in the schedule may be ordinarily rated devices designed to require substantially full X—Y voltage to operate them.

It is believed that the remaining details of the present embodiment may best be understood with reference to descriptions of typical operating sequences, it being recalled that all relays and contactors are shown in Figures 5A, 5B, and 5C in the normal de-energized positions thereof, that the limit switches are illustrated in the positions that they occupy when the corresponding track switches are in the illustrated open positions, and that the carrier mounted cam actuated switches are illustrated in their normal open positions. Under such conditions, any number of carriers may be considered as being located at random around the system, with their power and control collectors in electrical engagement with the power and control buses X, Y, and C.

As an example, the carrier, the controller for which is shown in Figure 5B and as being located at destination 2A—1B, may be considered as initially located at the destination 1A—1B in Figure 1, in which event its power and control collectors occupy the same relative positions, with respect to sectionalized portions of the power and control bus bars, as appears in Figure 5B.

Normally, a destination selection is made before the carrier is started away from the starting point, but a feature of the present system is that such pre-selection is not necessary and moreover, the selection can be changed at any time before the arrival of the carrier at an initially selected destination. Accordingly, for convenience, the operations involved in starting a carrier will be described first.

To start the carrier shown in Figure 5B, the start button 100 may be momentarily closed, thereby completing an obvious circuit, subject to the stop button 102, for the coil of the starting relay PGC. This circuit extends between the two supply conductors 104 and 106, which, as will be noted, are continuously connected to the power and return buses X and Y, through the power collectors 40 and 42 respectively. It will be recalled that the return bus Y is continuous throughout the system and that the power bus X is continuous except that it is sectionalized at each destination, to define a short section X1. Portions of the bus bar X at either side of each short section X1 are continuously interconnected by jumpers 108. Under the present conditions, the section X1 at the starting point is connected to the adjacent sections through the now closed back contacts PGDb of the control relay PGD, appearing in Fig. 5B.

Closure of contact PGCd completes a circuit through the tractor motor starting contactor PMC, which thereupon closes contact PMCa, starting the tractor motor TM.

Closure of contact PGCd also completes a circuit for the primary winding of the control transformer CT, thereby energizing the latter. This action is preparatory only, since the secondary circuit of this transformer is interrupted at contacts PALCa and PBCa of the selector relays.

Closure of contacts PGCb and PGCd of the starting relay PGC electrically connects the leading control collector LC to the power collector 40 associated with the power bus X, through a circuit which extends from collector LC through contacts PGCb, the coil of the protective relay PFC, contact PGCd, and collector 40 to the power bus X. Under the conditions stated, no circuit to the return conductor Y is completed through control collector LC and consequently no current flows in the just traced LC–40 circuit. Completion thereof does, however, elevate collector LC to the potential of the power bus X.

It will be noticed that the circuit for the starting relay PGC will remain complete so long as the carrier mounted supply conductors 104 and 106 are energized, but that the circuit for the tractor motor starting contactor PMC is additionally subject to the back contacts PFCb of the protective control relay PFC. The last-mentioned relay remains deenergized unless and until, as described below, the associated carrier approaches a track switch which is under control of a leading carrier or is otherwise not in shape to receive the carrier in question, or unless such carrier approaches too closely to a stalled leading carrier. Conductors 104 and 106 are not de-energized until a selected destination is reached, and consequently the operations described above serve to place the carrier in operation and to maintain it in operation until a selected destination is reached.

As to the selection of the destination, selecting dials 60 and 64 are shown in Figure 5B, in positions corresponding to the destination 2A—1B. Such setting is preparatory only, since the associated circuits are interrupted at the now open contacts PALCa and PBCa of the selecting relays.

As the carrier in question approaches the exit switch ES at the exit end of the siding R1, the switch is automatically closed thereby so as to permit the passage of the carrier in question on to the main line R. The operations involved are the same as those involved in moving a carrier from the siding shown in Figures 5A, 5B, and 5C on to the main line and consequently may be described with reference to Figure 5C. More particularly, as the carrier in question approaches the switch ES, the control collector LC moves into engagement with the control bus section C20, which section is directly connected, through conductor 110, and the coil of the switch closing relay PCE, to the return power bus Y. Under the conditions stated, collector LC is at the potential of, and is electrically connected to, bus X. This action, therefore, completes a circuit for relay PCE, through the previously traced circuit between the control collector LC and the power collector 40, in response to which relay PCE assumes the energized position, opening its contacts PCEa and closing its contacts PCEb. The operation of contacts PCEa is without effect in connection with the operation now being described (being concerned with preventing interference between carriers), but closure of contacts PCEb completes an obvious energizing circuit for the coil of the switch closing contactor CME, which thereupon closes its contact CMEa and energizes the switch motor EM, causing the latter to move the switch ES to the closed position.

It will be noticed that in the just described circuit for the switch closing relay PCE, this relay and the carrier mounted protective relay PFC are in series relation. As is pointed out above, relay PCE is relatively high in impedance compared to relay PFC. Consequently, when such relays are energized in series, the voltage drop across relay PFC is insufficient to operate the latter, whereas the voltage drop across relay PCE is sufficient to operate it.

When the switch ES reaches the fully closed position, limit switch ELS2a opens and limit switch ELS2b closes. Accordingly, when the control collector LC passes out of engagement with bus bar section C20 and into engagement with section C21, the circuit for relay PCE is maintained through limit switch ELS2b. Under such conditions, accordingly, the carrier is enabled to pass into the switch.

On the other hand, if the switch ES has not reached the fully closed position, by the time collector LC passes out of engagement with section C20, the carrier is automatically stopped at the entrance to the switch, until such time as the switch does attain the fully closed position. More particularly, under such circumstances, when the control collector LC moves into engagement with section C21, the still closed limit switch ELS2a directly connects the control collector LC to the return conductor Y, thereby impressing full X—Y bus bar voltage across the protective relay PFC. Relay PFC is operably responsive to such bus bar voltage and thereupon assumes the energized position, closing its contact PFCa and opening its contact PFCb. Contact PFCa is concerned with the stopping of a following carrier, described hereinafter, but the opening of contact PFCb interrupts the originally traced circuit for the tractor motor contactor PMC, which thereupon opens, de-energizing the tractor motor TM, and stopping the carrier. As soon as the switch ES does reach the fully closed position, limit switch ELS2a opens, disconnecting section C21 and consequently the control collector LC, from the return bus Y. This de-energizes the protective relay PFC, and restores the circuit for tractor motor contactor PMC, enabling the latter to close its contact PMCa and restart the associated carrier.

It will be noted that when the track switch reaches the closed position, the consequent opening of limit switch ELS2c de-energizes contactor CME and stops the switch motor EM.

When the leading collector LC passes out of engagement with section C21, all energizing circuits for relay PCE are interrupted and the latter resumes its illustrated position, reclosing its contacts PCEa and PCEc and reopening its contact PCEb. The reclosure of contact PCEa is without effect in the sequence now being described. The reopening of contact PCEb is without effect since limit switch ELS2c is now open, and the reclosure of contact PCEc serves only to prepare the switch closing circuits.

The control section C17 is at least as long as, and is preferably somewhat longer than, the spacing between the control collectors LC and TC. Consequently, the leading collector LC does not engage the control section C18 until the carrier has fully cleared the switch. When section C18 is so engaged, an obvious circuit, through the now closed contacts PCEc, is completed for the switch opening relay POE, which circuit includes the high impedance relay POE and the carrier mounted protective relay PFC in series relation. As in the case of relay PCE, relay PFC fails to operate; but relay POE is energized, and closes its sole contact POEa, thereby energizing the opening contactor OMEa for the switch motor EM. As will be obvious, this action causes contact OMEa to close, and energizes the switch motor EM in a direction to cause the switch to move to the open position. As the switch starts away from the closed position, the limit switches ELS2a, ELS2b, and ELS2c resume the illustrated positions and, when the switch reaches the fully open position, the limit switches ELS1a, ELS1b, and ELS1c resume the illustrated positions. The opening of limit switch ELS1c, of course, de-energizes the switch motor.

As the leading control collector LC leaves section C18, the circuit for the opening relay POE is interrupted, thus restoring all of the exit switch circuits to the illustrated condition.

As is pointed out above, in the illustrated embodiment, the selections made by the carrier mounted dials 60 and 62 determine the points at which the associated carrier shall leave the main line and turn on to a siding. Accordingly, in such illustrated embodiment, the cams A (Figure 1) are located around the system, in such positions that, between the time a carrier leaves a siding and the time it reaches another siding switch, the "A" or switch selecting circuits are rendered effective. Thus, as appears in Figure 1, a cam A is positioned between the switch at the exit end of the siding R1 and the siding switch leading on to the siding R2. As the carrier passes the just-mentioned cam A, the carrier-mounted, cam-operated switch CSA is momentarily closed, which action completes an obvious energizing circuit for the selecting relay PALC. When so energized, relay PALC closes its sole contact PALCa and, being of a latching type, provided with a usual latch 120, it latches itself in the closed position. As the carrier leaves cam A accordingly, the reopening of cam switch CSA is without effect.

Closure of contact PALCa electrically connects the two control collectors LC and TC together through a circuit which extends from collector LC through the now closed contact PGCb, the secondary winding CT of the control transformer, a small protective resistor 122, a portion of the inductance L, movable tap 124, now closed back contact PZCc, and the now closed front contact PALCa to the trailing collector TC. In response to completion of the just-mentioned circuit, a potential difference equal to the output voltage of control transformer CT is impressed between the collectors LC and TC. If under the conditions stated, both collectors LC and TC should engage the control bus C, transformer CT would be enabled to pass current through the just traced LC and TC circuits. Such a circulating current would be of no consequence, since such circuit includes no relay or contactor coils and moreover, such current would be of a comparatively low value in view of the presence in the circuit of at least a portion of the impedance L and resistor 122. Since the sections C of the control bus are shorter than the spacing between the collectors, the just mentioned circulating current is enabled to flow only during intervals while the carrier is passing over sections, such as C12, which are longer than the LC and TC spacing.

As the carrier approaches the siding switch SS, leading on to the siding R2 (Figures 1 and 5A), the leading control collector LC passes into engagement with the initial switch portion C1 of the control bus. If, at the time control collector LC engages section C1, the switch SS is in its normal open condition, such engagement is without effect and the carrier movement continues uninterruptedly. If at such time the switch SS is in any position other than the fully open position, the limit switch SLS1c is closed and is consequently effective to directly connect the section C1 and consequently the leading collector LC, to the return bus Y. It will be recalled that at any time that the collector LC is directly connected to the return bus Y, the protective relay PFC is energized, and operates to stop the carrier. As soon as limit switch SLS1c opens, however, indicating that the switch SS is in normal condition, the carrier mounted protective relay PFC is de-energized, enabling the carrier to re-start.

Engagement of control bus section C2 is without effect. So, also, is engagement of section C3 by the leading collector LC. Shortly after the trailing collector TC leaves section C1, the leading collector LC engages section C4.

Engagement of C4 by collector LC may or may not have any effect upon the movement of the carrier in question. If the siding switch SS is in the fully open position, limit switches SLS1b and SLS2b occupy the illustrated positions, and so do not complete any direct circuit between section C4 and the return bus Y. Under such conditions, such engagement completes a circuit from collector LC through coil of high impedance relay PSS and limit switch SLS2b to the return bus Y. It will be recalled, however, that a direct or virtually direct connection between collector LC and the return bus Y is needed in order to operate the carrier mounted protective relay PFC. Consequently, the just-mentioned circuit including relay PSS does not complete an operation of the protective relay PFC and the carrier movement continues. Completion of such circuit does, however, energize the high impedance relay PSS which thereupon closes its contact PSSa. This connects section C1 to the return bus Y, in readiness to stop any following carrier.

On the other hand, if, at the time section C4 is engaged by collector LC, the switch SS is in some intermediate position (indicating an abnormal condition), both limit switches SLS1b and SLS2b are closed, which action causes an operation of the carrier mounted protective relay PFC, causing the carrier to stop until the faulty condition is corrected.

As the leading collector LC passes the section C4, the collectors LC and TC move into engagement, respectively, with the spaced sections C5 and C3, thereby completing an output circuit for the control transformer CT, having predetermined components of inductive and capacitive reactance. More particularly, such circuit extends from one secondary terminal of transformer CT, through resistor 122, a portion of inductance L determined by the setting of dial 60, the trailing collector TC, bus bar section C3, capacitor CS, the coil of the selective relay SRS, section C5, the returning control collector LC, and contact PGCb to the other secondary terminal of transformer CT. In such circuit all of the capacitive reactance, for practical purposes, is represented by condenser CS, and the inductive reactance is, of course, represented primarily by the inductance L and relay SRS. The impedances of transformer CT and relay SRS may be regarded as comparatively low and preferably the resistive components of the circuit are low in relation to the reactive components. Thus, the resonance curve of the just traced circuit is relatively sharply peaked. Similar comments apply to the tuned circuits for other siding switches and for the destinations. Consequently, if the reactance represented by condenser CS is approximately equal to the inductive reactance of the circuit at the frequency of the alternating voltage energizing the system being described, transformer CT is enabled to pass a relatively high current through the circuit, of a value sufficient to operate the selective relay SRS. It will be appreciated, accordingly, that the condenser CS, at the siding switch in question, is proportioned to match the setting of dial 60. Similar comments apply to the condensers which are associated with all other siding switches. That is to say, the condensers at the other siding switches are proportioned to match the corresponding amounts of inductance L which are included in the tuned circuits at the corresponding different settings of dial 60.

In an illustrative case, and assuming 60 cycle alternating current and that the reactive components of all tuned circuits are represented primarily by the siding and destination condensers CS and CD and by the included portions of inductance L, the condensers and the included portions of inductance L for various A and B settings of dials 60 and 62 and 64 and 66 may conform to the following schedule. Greater or smaller differences between successive capacitive and inductive values may, of course, be employed if desired, depending upon the sensitivity of the relays such as SRS and SRD.

*Approximate L and CS or CD values resonant at 60 cycles*

| Portion of L in circuit | | CS or CD at Siding or Destination corresponding to dial setting (microfarads) | Included portions of Reactance of L, CS or CD (Ohms) |
|---|---|---|---|
| Position of Dials | Henries | | |
| 1st | .185 | 38 | 70 |
| 2nd | .370 | 18.7 | 140 |
| 3rd | .555 | 12.6 | 210 |
| 4th | .740 | 9.4 | 280 |
| 5th | .925 | 7.5 | 350 |
| 6th | 1.110 | 6.3 | 420 |
| 7th | 1.295 | 5.4 | 490 |
| 8th | 1.480 | 4.7 | 560 |
| 9th | 1.665 | 4.2 | 630 |
| 10th | 1.850 | 3.8 | 700 |

Reverting now to the control operation in progress, the selective relay SRS, upon being operated, opens its contact SRSa (without immediate effect) and closes its contact SRSb, thereby completing an obvious circuit for the closing contactor CMS associated with the siding switch motor SM. This action causes closure of the contact CMSa and starts the closing operation of the switch SS. As soon as the switch SS reaches the fully closed position, limit switch SLS2a opens, de-energizing the siding switch motor.

As soon as the siding switch SS starts towards the closed position, the previously identified limit switch SLS1c closes, completing a direct connection between section C1 and the return bus Y, for the previously identified control of any following carrier.

It will be noticed that between the time the leading control collector LC left section C4 and the limit switch SLS1c closed, the circuit for the coil of relay PSS is interrupted. As indicated by the legend, however, relay PSS is of a usual slow return type, and is effective to maintain its contact PSSa closed sufficiently long to maintain the connection for section C1 until such a time as the limit switch SLS1c does close. The justmentioned timing interval is, of course, very short.

When the control collectors LC and TC pass out of engagement with the sections C3 and C5, the previously identified tuned circuit is interrupted, thereby de-energizing relay SRS, which action is without immediate effect since the circuits controlled thereby are interrupted elsewhere. As it leaves section C5, the leading control collector LC engages section C6. Assuming that the track switch is now fully closed, such engagement is without effect in view of the open condition of limit switch SLS2b. If the switch is not fully closed, such engagement immediately connects collector LC to the return bus Y through the now closed limit switches SLS1b and SLS2b, thereby stopping the carrier.

Assuming the switch is in proper condition, the carrier passes on to the siding R2, and collector LC passes across section C9 without effect and engages section C10. This action completes an energizing circuit for the closing of relay PLS. This circuit includes relay PLS and the carrier-mounted protective relay PFC in series, but, as before, due to the relatively high impedance of relay PLS, relay PFC does not operate. Relay PLS does operate, however, and closes its sole contact PLSa, completing a circuit through the now closed limit switch SLS1a, for the switch motor opening contactor OMS. Upon being energized, contactor OMS closes its contact OMSa energizing the motor SM and causing the latter to return the switch SS to the illustrated open position. As soon as the switch moves away from the closed position, the limit switches SLS2a and SLS2b resume the illustrated positions, and as soon as the switch attains the fully open position, the limit switches SLS1a, SLS1b, and SLS1c resume the illustrated open positions, thereby de-energizing the switch motor SM and disconnecting the control section C1 from the return bus Y. The latter is without effect except in the event that a following carrier has its leading control collector in engagement with the section C1.

At any time after completing its movement through the switch SS, the carrier may encounter a cam B, thereby transferring the control of the carrier from the switch selecting elements to the "Destination" selecting elements. As shown in Figure 5A, a cam B is located in the immediate region of the control section C10. Upon being engaged, this cam closes the carrier-mounted cam-operated switch CSB, which, at its contacts a, energizes the reset winding 130 associated with the "A" selecting relay PALC. At its contacts b the switch CSB completes an obvious energizing circuit for the "B" selecting relay PBC which thereupon assumes the energized position, closing its contacts PBCa and PBCb. At the latter contacts, relay PBC completes a self-holding circuit for itself and at the former contacts, relay PBC renders the dial 64 effective to determine the amount of inductance L which is included in the selecting circuit which extends between the control collectors LC and TC. It will be noticed that the opening of the "A" selecting relay PALC renders dials 60 and 62 ineffective. In Fig. 5B, dial 64 is in a position corresponding to the first station 1B and it will be understood that the control condenser CD in the control circuit for the indicated destination 2A—1B is proportioned to match the just-mentioned setting of the dial 64.

Accordingly, when the carrier reaches the position shown in Figure 5B, in which collectors LC and TC are in engagement, respectively, with bus sections C11 and C12, a circuit including the destination selecting relay SRD is completed, which circuit extends from the coil of relay SRD, section C11, collector LC, contact PGCb, the secondary winding of control transformer CT, resistor 122, the portion of inductance L which is determined by the setting of dial 64, and thence through contacts PZCa and PBCa, collector TC, section C12, and condenser CD to the other terminal of coil SRD. Since destination 2A—1B corresponds to the indicated setting of dial 64, the reactive components of said circuit are substantially balanced so that the circuit is in a substantially resonant condition. Consequently, a relatively high current flows therethrough and operates relay SRD, which thereupon opens its contact SRDa and closes its contact SRDb. Closure of contact SRDb energizes the stopping relay PGD, which thereupon closes its contact PGDa and opens its contact PGDb. The opening of the latter contact isolates the section X1 of the power bus X, which as will be understood, has the effect of de-energizing the carrier-mounted control conductors 104 and 106. The last-mentioned action automatically de-energizes the tractor motor TM, the carrier starting relay PGC, the "B" selecting relay PBC, the tractor motor contactor PMC, and the control transformer CT, thereby restoring all carrier-mounted circuits in Fig. 5B to the condition shown. The de-energization of the tractor motor TM, of course, brings the carrier to rest at the destination 2A—1B.

Assuming that the transfer switch TS in series with contacts PGDa and SRDa, is in the open position, the above operations which result from the de-energization of conductors 104 and 106 are all that take place as an incident to the stopping of the carrier at the destination 2A—1B. It will be understood that under such circumstances the carrier may be restarted from the just mentioned destination by again closing the starting switch 100, thereby duplicating the previously described operations, and it will be appreciated also that either before or after the restarting of the carrier, a new destination selection may be made by appropriately setting the dials 60 and 64 to correspond to the destination selected. In many cases, however, it may be desired to automatically perform other operations as an incident of the stopping of the carrier at the selected destination. For example, the carrier may be suspended from the tractor by means of hoisting apparatus, dumping apparatus, or the like, and it may be desired to actuate such hoisting apparatus, dumping apparatus, or the like upon the arrival of the carrier at the selected destination. Additionally, it may be desired to automatically select a predetermined return destination, such, for example, as the original starting point 1A—1B, to which the carrier shall return as soon as it is started. To accommodate such operations, as well as others, the just mentioned transfer switch TS may be moved to the illustrated closed position. In such event, the de-energization of selecting relay SRD which takes place when the control transformer CT is de-energized, as aforesaid, causes relay SRD to resume the de-energized position, interrupting the circuit for relay PGD at contacts SRDb. Relay PGD is of the slow return type, and, consequently, it maintains its contact PGDa closed for a short interval after the circuit for the coil is interrupted. During this interval, both of contacts PGDa and SRDa are closed, and complete a circuit for the auxiliary control relay PXC, which circuit extends from the power bus X, through transfer switch TS, contacts PGDa and SRDa, control section C11, collector LC, the coil of relay PXC, and the now closed contact PGCc and collector 42 to the return bus Y. Upon completion of this circuit, which remains completed only momentarily, relay PXC is energized and closes its contacts PXCa and PXCb. The operations resulting from closure of contacts PXCb are not illustrated, since they form no part of the present invention. They may be, for example, dumping, hoisting operations, or the like, which operations conventionally may be instituted by momentary closure of contact PXCb. At its contact PXCa, relay PXC prepares an energizing circuit for relay PZC.

At the expiration of the short timing interval of relay PGD, it reopens its contact PGDa and recloses its contact PGDb. The latter action re-energizes bus section X1. The opening of contact PGDa interrupts the energizing circuit for relay PXC. Relay PXC is of the slow return type, and consequently its contacts PXCa remain closed for a short interval after bus X1 is re-energized. During this interval relay PZC is energized through an obvious circuit, and immediately completes a self-holding circuit for itself through contact PZCe, enabling relay PXC to time out without effect. As will be evident, the holding circuit for relay PZC remains complete until the control conductors 104 and 106 are again de-energized by the arrival of a car at a selected destination. At its contacts PZCa, PZCd, PZCc, and PZCd, relay PZC disconnects dials 60 and 64, and connects dials 62 and 66, which may, of course, be set to correspond to any desired destination on the system. As shown, dials 62 and 66 are set for the initial starting point 1A—1B and it is believed to be obvious that if the carrier be started, by re-energizing the starting relay, the carrier will travel along siding R2, operate the exit switch ES at the exit end of such siding in the manner previously described and re-enter the main line R. In traveling along the siding R2, the carrier will pass destinations 2A—2B through 2A—10B thereon. In successively passing these destinations, the tuned circuits of the present invention will be successively completed. In each instance, however, the values of the capacitor CD at the various destinations will be such that resonant conditions will not obtain and, consequently, the selective stopping relays SRD will not be energized. In the absence of such energization, no stopping action occurs, as will be understood.

As appears in Figure 1, an A cam is encountered shortly after the carrier in question leaves siding R2 and re-enters the main line, which action, as before, energizes the selecting relay PALC, rendering the dial 62 effective. It will be appreciated the siding switch SS at the entering end of the first siding R1 is provided with a selecting condenser CS which matches the first tap on inductance L. Consequently, with the indicated setting of dial 62, the carrier will operate the siding switch SS in the manner described in connection with the siding switch shown in Figure 5A, and will re-enter the siding R1. After entering such siding R1, a B cam is encountered, transferring the control to dial 66. It will be understood that the destination control circuit for the station 1A—1B, includes a control condenser CD which matches the first tap associated with dial 66. Consequently, upon reaching the destination 1A—1B, the carrier is stopped in the manner described in connection with the destination 2A—1B.

It will be recognized that usually the transfer switch TS in the destination control circuit for which dials 62 and 66 are set, will be opened since no automatic station selection or other automatic operations will be desired as a consequence of the arrival of the carrier at the starting point. Also, the carrier mounted transfer switches 101, 103, and 105 enable the automatic dumping (or other), redispatching and restarting functions to be selectively provided or omitted.

It will be appreciated that the re-starting of the car from a destination to which it has been dispatched may be effected either manually, by closure of the starting button 100, or automatically by momentary closure of the parallel connected contacts 140, which may be operated in any automatic manner as a consequence of the completion of any automatic dumping, hoisting, or other operations which have taken place at the destination as a consequence, for example, of the closure of contacts PXCb.

Reverting to Figure 1, it will be noticed that all of the destinations 2A—1B through 2A—10B are disposed along the same siding R2. In being directed to a station on siding R2, the A selection (carrier-mounted dial 60) serves only to control the operation of the entering siding switch, and the B selection (carrier-mounted dial 64) serves only to select the particular destination along the siding at which the carrier is to be stopped.

In the alternative siding arrangement, represented by sidings R3 and R4, and the interconnecting subordinate sidings, it will be noted that, in traveling from any point on the main line to any of the destinations, such as destination 3A—1B, two siding switches are required to be operated, one being the siding switch SS at the entering end of the siding R3, and the other being the siding switch SS at the entering end of the sub-siding R3a which contains the destination 3A—1B. The former switch SS, at the entering end of the siding R3, being common to all of the destinations 3A—1B through 3A—10B, is operated in response to an A selection, as in the previous example. The switch SS at the entering end of the sub-siding, however, being individual to a particular destination, is operated in response to completion of the resonant circuit which is prepared by the setting of the B selecting dial 64. Accordingly, the B cam associated with siding R3 is located in advance of the sub-siding containing the destination 3A—1B. Thus, the B selection serves to control the operation of such switch SS, in the manner described above with reference to Fig. 5A; and also serves to control the stopping of the carrier (and any automatic operations incident thereto) at the station 3A—1B, in the manner described with reference to Fig. 5A. Accordingly, the control condenser CD for destination 3A—1B and the control condenser CS for the corresponding sub-siding switch SS have substantially the same capacity, so that the "1B" setting of dial 64 is effective to complete, in conjunction therewith, resonant circuits for the corresponding relays SRS and SRD. Similar comments apply to the destinations 5A—1B, etc., which occupy the sub-sidings between sidings R5 and R6.

Considering now the arrangements for preventing interference between successive carriers traveling along a main line or a siding, and for preventing entry of a carrier into a siding which is not in shape to receive it, it will be recalled that having been started, as by closure of its associated starting switch 100, a particular carrier remains in motion until such a time as it is stopped in normal fashion by its arrival at a selected destination (resulting in the de-energization of the carrier mounted control conductors 104 and 106) or until it is caused to make an emergency or protective stop in response to the energization of its carrier mounted protective relay PFC. It will further be recalled that the characteristics of relay PFC are such that this relay will respond only if it is subjected to substantially full X—Y bus bar voltage; and that an effective energizing connection for relay PFC is made whenever its leading control collector LC encounters a control bus bar section which is directly connected to the return bus Y.

Reverting to Figure 5A, it will be recalled that as soon as the leading control collector LC of a leading carrier has engaged the control section C4 (and assuming the switch SS is in its normal open positon) an energizing circuit for the coil of relay PSS is completed, which thereupon becomes effective, by closure of its contacts PSSa, to directly connect section C1 to the return bus Y. If under these conditions a following carrier reaches the section C1, the circuit, indicated in dotted lines, near the bottom of Fig. 5A, for its protective relay PFC, is completed, and such following carrier is caused to stop and remain at rest until the connection of section C1 to the return bus Y is cleared. If the leading carrier is en route to a destination which requires that it shall close the switch SS of Figure 5A, it is effective to operate the relay SRS, thereby actuating the switch as previously described. Such actuation closes the limit switch SLS1c, which thereupon maintains the Y bus connection to section C1, until the leading carrier has passed through the switch and the latter has been automatically reopened.

If the leading carrier is not prepared to operate the switch SS at the siding switch in question, it does not operate the relay SRS. In this event the circuit for relay PSS is interrupted while collector LC of the leading carrier is passing over section C5 and engages section C6. This operation, of course, requires only a comparatively short time, less than the timing out period of relay PSS. As soon as the control collector LC of the leading carrier engages section C6, the circuit for relay PSS is recompleted, through the now closed limit switch SLS2b. This circuit for relay PSS is maintained by the leading control collector LC until it passes out of engagement with the control section C7. Before collector LC leaves section C7, the latter is engaged by the trailing collector TC, which maintains the holding connection for section C1 until the leading carrier has cleared the switch SS.

More particularly, it will be noticed that under the conditions stated, the trailing collector TC is electrically connected to the power bus X through a circuit (Figure 5B) which includes now closed selecting relay contacts PALCa, one or the other of contacts PZCc and PZCd, one or the other of brushes 124 and 125 (depending upon whether the carrier is, at the time, proceeding under the control of dial 60 or dial 62), a portion of inductance L, resistor 122, the secondary winding of control transformer CT, the coil of protective relay PFC, and now closed contacts PGCd and collector 40 to the power bus X. All of the relays which are designated in the foregoing relay and contactor schedule as being high in impedance, are sufficiently high in impedance, compared to the total impedance of inductance L and any other impedance elements in the just-traced circuit for collector TC, to be operably responsive, and to prevent an operation of relay PFC. Consequently, when collector TC engages section C6 (Figure 5A), it completes an operating circuit which maintains relay PSS in the energized position. As will be evident, this energizing circuit is maintained until the leading carrier completely clears the switch, at which time the trailing collector TC therefor passes out of engagement with section C7. This action de-energizes relay PSS and restores the switch circuits to the illustrated conditions, enabling the following car to automatically restart.

From the foregoing it will be seen that if a following car is enabled to pass section C1 of the control collector (Figure 5A), it means that any carriers ahead of it have entirely cleared the switch. If such following carrier is under way to a destination which does not require an operation of such switch it is consequently enabled, upon restarting, to pass the switch without effecting an operation thereof. On the other hand, if such following carrier is under way to a destination on the siding to which such switch leads, such carrier should not be enabled to close the switch and enter such siding unless the latter is in condition to receive it. If the siding is not in condition to receive the following carrier, the latter should be caused to by-pass the siding, and proceed along the main line, so as not to obstruct the progress of any other following carriers.

As an example, it may be assumed that the carrier shown in Figure 5B has passed through the switch SS and has come to rest at the indicated position, with its trailing collector TC in engagement with the control section C12. When such leading or first carrier cleared section C9 and engaged section C10, it reopened the switch, in accordance with previous description, enabling any previously held following or second carrier to restart. Such following or second carrier, if destined for the siding in question, causes closure of the switch, and passes therethrough, ultimately attaining the dotted line position shown in the upper right-hand portion of Figure 5A. In reaching such position, it operates relay PLS, at section C10, reopening the switch. When the leading collector LC of such second carrier engages the section C12, its protective relay PFC is energized through a circuit which extends from the power bus X, through the collector 40 of such second carrier, associated contacts PGCd, the coil of its relay PFC, associated contacts PGCb, and its collector LC to the control section C12. Under the conditions stated, such control section is directly connected to the return bus Y through the trailing collector of the now stopped leading carrier (Figure 5B).

This return circuit extends from the trailing collector TC of such leading collector through the now closed contact PGCa, and its return bus Y. Upon completion of this circuit the protective relay PFC for such second carrier assumes the energized position, and stops such carrier in accordance with previous description. Upon being stopped, the trailing collector TC of such second carrier connects the then engaged control bus section C9 directly to return, through a circuit like that just traced for the trailing collector TC of the leading carrier. Upon completion of this circuit, the relay PFS (Figure 5A) is energized through an obvious circuit extending between control buses X and Y and thereupon assumes the energized position, opening its sole contact PFSa. When open, contact PFSa prevents completion of a circuit for the closing contactor CMS associated with the switch motor SM.

As soon as such second carrier engaged control bus section C10 and reopened the switch, any other following or third carrier (such as the one indicated in dotted lines at the bottom of Figure 5A) is enabled to start. If such third carrier is not destined for the siding in question, it passes the switch without interference, as will be obvious. If such third carrier is destined for the siding in question, it is ineffective to reclose the switch, because of the now open condition of relay contacts PFSa. Such third carrier is consequently caused to pass the switch without operating the same. It is believed to be obvious that such third carrier is caused to travel upon the main line, with the system of Figure 1 as thus far described, until it has completely rounded the main line and again approached the siding in question. During such trip, such third carrier by-passes any siding switches SS which it encounters, because its dispatch setting does not match the switch controlling condensers at such other siding switches.

It will be recognized, accordingly, that so long as the trailing collector of the second carrier engages the section C9, it prevents any such third carrier from entering the siding in question. As previously mentioned, control bus section C9 is somewhat longer than the spacing between the control collectors LC and TC of the various carriers. Consequently, as soon as such second carrier clears section C9, sufficient room is afforded on the siding to accommodate the third carrier, and it then becomes effective, if necessary, to prevent a fourth carrier from entering the siding.

It is of course usual to provide the tractor motors with inching control means, diagrammatically illustrated and labeled in Fig. 5B. It will be noticed that inching operations do not involve operating relay PGC. Accordingly, a carrier which is being inched along has the same effect on following or trailing carriers as a carrier which is at rest.

Considering now the protection against interference between carriers in the region of the exit switches, such as ES, Figure 5C, it will be appreciated from previous description that as soon as the control collector LC of a carrier on the siding R2 engages the control section C20, the switch opening relay PCE for the corresponding switch ES is energized, which action results in a closing movement of the switch ES. As soon as the closing movement is instituted, the limit switch ELS1a closes, directly connecting the control section C15 to the return bus Y, through conductors 150 and 152. This direct connection remains complete until the switch ES is restored to the open position, which action does not take place until the carrier, which has operated the switch, has passed entirely therethrough and cleared the same, all as described above. If, during the time that the just-mentioned direct connection of section C15 to the return bus Y is completed, a carrier approaches the indicated switch ES on the main line, such approaching carrier is stopped by energization of its protective relay PFC, as soon as the leading control collector LC thereof engages the section C15. The stopping control circuit for such approaching carrier is indicated in dotted lines in the upper portion of Figure 5C.

On the other hand, if a carrier approaches an exit switch on the main line, and reaches the section C15, before a carrier, approaching on a siding, has reached the section C20, the main line carrier takes control. More particularly, as soon as the control collector LC of the main line carrier reaches the section C15, a circuit for the control relay PBE for the siding switch in question is completed, which circuit extends from the power bus X, collector 40 of the main line carrier, the circuit shown in dotted lines for such carrier to the control collector LC thereof, and thence from section C15 through the now closed back contact PCEa, to the coil of the relay PBE. Upon being energized, relay PBE closes its contact PBEa, placing a short circuit around the coil of the switch closing relay PCE and also directly connecting the control section C20, of the corresponding siding, to the return bus Y. The just-mentioned short circuit prevents energization of the switch closing relay PCE, so long as the relay PBE is energized. Similarly, the direct connection of section C20 to the return bus Y serves to hold any carrier, approaching on the siding, and prevent the latter from passing the section C20. The stopping circuit for such approaching carrier is indicated in dotted lines in the lower central portion of Figure 5C.

The aforesaid carrier approaching on the main line is effective to maintain the protective relay PBE energized until such time as the carrier completely clears the siding switch. More particularly, control sections C15 and C16 are jumpered together, from which it will be appreciated that the aforesaid circuit for relay PBE is maintained so long as the leading control collector LC for the main line carrier engages section C16. As soon as such control collector engages section C17, a second circuit for relay PBE is completed, which includes conductor 153, the now closed limit switch ELS1b and contact PCEa. As previously mentioned, control section C17 is somewhat longer than the overall length of the carrier and consequently the leading control collector LC does not pass out of engagement therewith until such main line carrier has passed off of section C16, and has cleared the switch, thereby freeing the switch for operation by carriers approaching on the siding.

Reverting to the case in which a carrier, approaching on a siding, reaches the section C20, before a carrier, approaching on the main line, reaches the section C15, it will be noticed that the siding carrier locks out the protective relay PBE, as soon as the switch opening relay PCE is energized, and opens its back contacts PCEa.

In the event a carrier on the main line becomes stalled in the switch area due to power failure, and consequently fails to restart when power is restored, relay PFE prevents a switch operation by a carrier approaching on the siding. More particularly, it may be assumed that such a main line carrier is stopped with its leading collector LC on section C16, in which event its trailing collector TC is on section C15 (section C15 being slightly longer than the LC and TC spacing). Under these conditions, relay PFE is energized through a circuit which extends from bus X, through relay PFE, section C17, limit switch ELS1b, conductor 150, jumpered sections C16 and C15 and thence through the trailing collector TC to the return bus Y. If the stoppage occurs while the trailing collector TC is on section C16, a similar circuit for relay PFE is completed. If the stoppage occurs while collector TC is on section C17, it completes an obvious direct circuit for relay PFE.

While energized, relay PFE closes its sole contact PFEa, thereby connecting the section C20 to the return bus Y through conductor 153, section C17 (or through switch ELS1b, conductor 150 and either or both of sections C16 and C15) and thence through the collector TC of the stalled carrier, to the return bus Y. Such connection is, in accordance with previous description, effective to prevent a switch operation by such a siding carrier.

Similarly, if a carrier which has passed a siding switch stalls on the main line, within the switch area (that is, with its trailing collector TC on either of sections C6 or C7) such collector connects section C4 to the return bus Y, thereby holding any following carrier and preventing a switch operation thereby.

It will be appreciated that the various carriers operating upon the system may be expected to operate at substantially the same speeds and that consequently there is little likelihood that a following carrier will overake a leading carrier and collide therewith while both are in motion. Suitable control means for maintaining a desired spacing between carriers, and for positively preventing such collisions, is described in connection with the embodiment of Figures 10A, 10B and 10C. Such spacing control means may be utilized in connection wtih the embodiment now being described, but are not shown, in order to simplify the drawings. On the other hand, it is, of course, important that a carrier which has been stopped at any point along either a siding or a main line, shall be effective to bring following carriers to rest. This action is afforded, as described above, by the action of the trailing collector of a stopped leading carrier in connecting the control bus directly to the return bus Y.

In the examples thus far given, it has been assumed that a particular siding is long enough, and that the initial destination thereon is sufficiently far from the corresponding siding switch SS, to permit a plurality of carriers to simultaneously occupy such siding. In certain cases, the arrangement may be such that a siding should accommodate only a single carrier at a time, in which event in accordance with the present invention, a carrier, having entered such a siding, is effective to prevent other carriers from entering the same until the first carrier has cleared the siding. By way of example, such an arrangement is useful in instances in which it is desired to dispatch a plurality of carriers to a group of sidings in succession, and in which the dispatcher may not be in a position to know in advance which of these sidings have been vacated by carriers previously dispatched thereto. Thus, a plurality of adjacent sidings may be given the same station designation, as illustrated by the branch sidings which interconnect the sidings R5 and R6 in Figure 1.

In accordance with the present invention, the siding switch controllers for the siding switches SS' leading to such sub-sidings, may take the form shown in Figure 6. It is here noted that such controllers duplicate the controllers shown in Figure 5A, with the exception that relays PLS and PFS of Figure 5A and their associated circuits are replaced, in Figure 6, by relays PLS' and PFS' and their associated circuits.

Referring particularly to Figure 6, it will be apreciated that the indicated siding switch may represent any of the siding switches SS' leading on to the sub-sidings which interconnect the sidings R5 and R6 of Figure 1. The first two of such sub-sidings each bear the station destination 5A—1B. From previous description, accordingly, it will be appreciated that the destination control condensers CD and the corersponding sub-siding switch control condensers CS for such destinations and sub-sidings will all match each other. Thus, to dispatch a carrier to either of the destinations 5A—1B, the corresponding dial 60 is set to the fifth terminal, whereas the dial 64 is set to the first terminal. The setting of dial A enables the carrier in question to operate the siding switch SS leading from the main line on to the siding R5, while the setting of dial 64 conditions the carrier to operate either of the siding switches SS leading to the sub-siding R5a and R5b. It is believed to be unnecessary to retrace, with reference to Figure 6, the operations whereby a carrier so dispatched to a station 5A—1B is enabled to operate the aforesaid switches SS. Considering the manner by which a carrier, having entered the siding R5a, for example, is enabled to by-pass a similarly dispatched following carrier to the siding R5b, it will be noticed that as soon as the leading collector LC of such first carrier engaged the control section C10, an energizing circuit is completed for the relay PLS', which thereupon closes its contacts PLS'a and PLS'b. Closure of contacts PLS'a has the same effect as described with respect to contacts PLSa in Figure 5A; namely, such closure initiates a re-opening operation of the switch. Closure of contacts PLS'b in Figure 6 completes an obvious energizing circuit for the protective relay PFS', which thereupon opens its contact PFS'a, and prevents completion of a circuit for the closing contactor CMS. When energized, relay PFS' also closes its contact PFS'b, completing a self-holding circuit for itself, which remains complete until limit switch ELS2d reopens. Limit switch ELS2d is located at the exit switch for the corresponding siding and remains closed until such siding switch is closed. It will be recalled that such a switch is closed only as an incident to the departure of the carrier from the corresponding siding. Accordingly, until the carrier which has entered the siding in question has operated the exit switch as an incident to its departure therefrom, no following carrier is able to operate the siding switch leading to such siding. If, therefore, while one carrier is on the siding R5a, another carrier enters the siding R5, destined for a station 5A—1B, such following carrier by-passes the siding R5a, and enters the siding R5b. If such a following carrier finds the siding R5b is occupied, it by-passes the same, and either enters a succeeding siding containing a station 5A—1B, or passes along the siding R5, re-enters the main line R, and ultimately re-enters the siding R5.

In the above described embodiment, the track layout is such, as previously mentioned, that all destinations can be reached by making not more than two selections. Certain track layouts desirably involve more than two selections, and a further feature of the invention resides in the provision of an arrangement whereby more than two selections may be made in response to a single setting of the A and B selecting dials 60 and 62 and 64 and 66. Examples of the need for such additional selections appear in Figure 1, in connection with the siding R4, and in Figure 7.

In Figure 1, it will be noted that the siding R4 directly connects the two opposite runs of the main line R, and also serves as an exit line from the sidings R3a, R3b, etc. It will be recalled that if a carrier destined for a destination associated with either of sidings R2 and R3 is caused to by-pass the corresponding siding switches SS, such carrier remains in operation until it again approaches such by-passed siding switch. The siding R4 may serve as a desirable "short cut," enabling such by-passed carrier to again approach the by-passed siding switch without having to traverse the entire length of the main line. In accordance with the present invention, accordingly, the siding switch SS'' associated with siding R4 is rendered responsive to the approach of carriers destined for a destination associated with either of sidings R2 and R3. Such a carrier, accordingly, having been by-passed, enters siding R4, passes therefrom on to the main track R and is enabled, after a considerably shorter trip than would otherwise be the case, to again approach its destination. In the layout of Figure 7, the main line R' is provided with a siding R1', and is also provided with a branch line R'' from which two sidings R2' and R3' extend. As will be appreciated, carriers destined for either of sidings R2' and R3' are required to operate a siding switch SS'', leading on to the branch line R'' and to also operate the siding switch SS corresponding to the siding, R2' or R3', to which the carrier is dispatched.

Referring now to Figure 8, the illustrated switch controller SS" corresponds to the previously described switch controllers SS, with the exception that in this instance, two pairs of tuned circuit sections C3 and C5 and C3' and C5' are provided, two switch controlling capacitors CS and CS', and two selective relays SRS and SRS' are provided. It will be appreciated that, for example, the elements associated with relay SRS may correspond to siding R2 of Figure 1 and siding R2' of Figure 7, and that the elements associated with relay SRS' may correspond to siding R3 of Figure 1 or to siding R3' of Figure 7. Accordingly, with reference to Figure 1, a carrier which is destined for siding R2, but has by-passed the same, actuates relay SRS of Figure 8 upon approaching siding R4 and enters such siding. Similarly, with reference to Figure 7, a carrier destined for a destination on siding R2', is effective to operate relay SRS of Figure 8 on aproaching the siding switch SS" of Figure 7 and enter the branch line R". Upon aproaching the switch SS leading to siding R2', such carrier is effective to operate the same, it being recognized that the tuned circuits associated with relays SRS for such two operated siding switches match each other and are operably responsive to the same A selection. Similar comments apply, with reference to Figures 1 and 7, to carriers destined for destinations associated with sidings R3 and R3' respectively.

With further reference to Figure 8, it will be noted that contacts SRSb and SRS'b of relays SRS and SRS' are connected in parallel with each other in the circuit of the closing contactor CMS so that such contactor responds to an operation of either thereof. Similarly, the contacts SRSa and SRS'a are connected in series with each other in the circuit of relay PLS, so that an operation of either such relay is effective to prevent operation of relay PLS.

Referring to the upper right-hand portion of Figure 5B, it will be appreciated that casual obstructions may be encountered at various points along the track system. Examples of such casual obstructions are elevators which serve to elevate or lower a carrier between tracks at different elevations, fire doors, and the like. Such casual obstructions may have limit switches such as 107 associated therewith which occupy the illustrated open position in the event the track system is open and which close when the track is obstructed. When closed, such limit switch directly interconnects the illustrated section of control bus to the return bus Y and is thus effective to stop and hold approaching carriers until the obstruction is cleared.

The embodiment of the invention shown in Figs. 10A, 10B, 10C and 11 is, in a generic sense and with certain exceptions, noted below, functionally equivalent to the above-described embodiment of the invention. The system of Figs. 10A, 10B, 10C and 11 may be characterized, however, as one wherein the carrier-mounted controllers include destination selecting means which impress any of a plurality of selected voltages upon the leading control collector LC and the controllers for the various siding switches and destinations include means which are selectively responsive to one or more of such control voltages.

The carriers for the system of Figs. 10A, 10B, 10C and 11 may be of the same type which are described above in connection with the first embodiment, and the power and control collectors thereof may be similarly arranged, which relationship is indicated by the use of corresponding reference characters. Similarly, the siding and exit switches may embody the same mechanical construction.

The carrier-mounted controllers of Fig. 10B embody a series of control relays CR1, CR3, CR4, and CR5, a tractor motor contactor CR2, selector relays CRA and CRB and associated auxiliary relays CRAA and CRBB, and a pair of auxiliary control relays PXC and PZC. Additionally, each carrier-mounted controller includes a starting button 100, a stop button 102, an auto-transformer AT, and a push button station having a row of A selecting buttons 1A through 10A, and a row of B selecting buttons 1B through 10B. As in the earlier embodiment, the A buttons serve primarily to determine what siding switches a particular carrier shall operate in moving to a desired destination, and the B buttons serve to determine the destination, on a particular siding, at which the carrier shall be caused to stop. As before, the B buttons may also make switch selections, as in the case of sidings r5 and r5a, etc of Fig. 11. The individual buttons are connected to corresponding taps on the auto transformer AT. In a typical case, arranged to provide for up to ten sidings, and up to ten destinations on any particular siding, correspondingly located A and B buttons may be connected to respectively 27, 34, 43, 55, 70, 89, 113, 143, 182 and 230 volt taps on the auto-transformer AT, it being assumed that the X and Y bus bar voltage is approximately 230 volts. In this connection it will be understood that it is only necessary to provide a sufficient voltage difference between successive taps to insure that the voltage responsive elements, described below, at the siding switches and at destinations, will respond properly. The above voltage distribution has been found to be ample for most systems, even allowing for line voltage variations of the order of 15%. If necessary, or desirable, of course, voltage regulating apparatus may be provided to maintain the output voltages of the auto-transformer at uniform values, independently of variations in voltage between the power and return buses X and Y.

Each siding switch controller includes a pair of control relays CR8 and CR9 which are selectively responsive to the corresponding voltages established at the carrier-mounted push button station, and co-operating control relays CR6, CR7, CR10, CR11, CR12 and CR13, a pair of siding motor contactors OMS and CMS, a pair of saturable core transformers ST1 and ST2, and a pair of track-switch-operated limit switches SLS1 and SLS2. In a typical case, transformers ST1 and ST2 may be arranged to provide, for example, a five-volt secondary output in response to the application to its energizing circuit of a voltage ranging anywhere between approximately 20 volts and 230 volts, corresponding respectively to the lowest and highest taps on the auto-transformer. All siding switch controllers may be identical except in respect to the response characteristics of the corresponding selective relays, all as is discussed below.

At suitable points along the system, between each siding switch and the first destination on the corresponding siding, and/or the first sub-siding leading from such siding, a control assembly comprising a transformer 302 and a control relay CR14 may be located for the purpose of effecting a transfer between the A and B selectors, as described below.

All destination controllers may be duplicates (except in respect to voltage response characteristics), and each may be provided with a controller comprising a destination control relay CR15 and an associated auxiliary control relay CR16. As in the previous embodiment, each destination controller responds to the approach of the carrier for which the corresponding B button has been closed and serves to cause such carrier to stop. Also, as in the previous embodiment, associated relays CR15 and CR16 may be arranged to initiate any of the series of automatic operations, such as dumping, hoisting, etc., at such destination. The auxiliary relays may also serve to cause the car to be automatically redispatched to a selected home station.

All exit switch controllers may be duplicates, and each comprises a series of control relays CR17, CR18, CR19, CR20, CR21 and CR24, associated saturable core transformers ST3 and ST4 which may and preferably do have the same characteristics as the previously identified transformers ST1 and ST2 and track-switch-operated limit switches ELS1 and ELS2. Additionally, each exit switch controller includes opening and closing contactors OME and CME.

Each of the spacing block controls, which may be variously distributed throughout the system, usually only on the main line, serve, as previously stated, to prevent a following carrier from too closely approaching a leading carrier. Each such spacing block control is illustrated as comprising control relays CR22 and CR23 and a saturable core transformer ST5, having the previously identified characteristics.

As before, the track-switch-operated limit switches may be conventionally mounted upon the track-switch structures so as to be operably responsive to the movements thereof. Each limit switch SLS1 occupies the illustrated closed position, except when the corresponding siding switch is fully closed; each limit switch SLS2 occupies the illustrated open position only when the corresponding siding switch is fully open. Similar comments apply, respectively, to limit switches ELS1 and ELS2, for the various exit switches.

The system of Figs. 10A, 10B, 10C and 11 is applicable to a wide variety of tract layouts, including layouts like that of Fig. 1, and consequently a complete such layout has not been shown for the system of Figs. 10A, 10B, and 10C. An illustrative layout is diagrammatically shown in Fig. 11. As in the previous embodiments, the return bus Y may be and preferably is electrically continuous throughout the entire system; the power bus X may be and preferably is electrically continuous throughout the entire system except that each destination is provided with a short section X1 which is insulated from the rest of the bus. The control bus C in turn is sectionalized throughout its length. In the regions of the siding and exit switches, destinations, and spacing blocks, the control bus sections are identified by the character C plus a subscript. Elsewhere such sections are identified by the single character C. Sections bearing a double-headed arrow are preferably slightly longer than the spacing between the collectors LC and TC. Sections bearing the legend --o-- are preferably as short as possible and allow only sufficient time to complete the control operation initiated thereby. All other control sections are shorter in length than the LC and TC spacing so that such sections are not simultaneously engaged by such both collectors LC and TC; and no sections are long enough to enable both collectors LC and TC of one carrier and either collector of a second carrier to simultaneously engage a single section. The gaps between control bus sections slightly exceed the lengths of the respective collectors LC and TC. Certain control bus sections are jumpered together, as pointed out below.

Relays and contactors shown in Figs. 10A, 10B and 10C may be conventional and occupy the illustrated positions when the coils thereof are de-energized but move to and remain in the obvious opposite positions when and so long as such coils are effectively energized. Assuming an XY bus bar voltage of 230 volts and further assuming the previously specified voltage distribution of the successive taps on the auto-transformer AT, the following operating characteristics for the various relays and contactors may be noted. Relays CR2, CR7, CR10, CR11, CR12, CR16, CR19, CR20, CR23, PXC, PZC, and CRBB, and contactors CMS and OMS may be ordinary potential relays and contactors adapted to respond to the application, to their energizing circuits, of the full auto-transformer voltage (in this case, approximately 230 volts). Similarly, relays CR1, CR3, CR17, CRA, and CRB may be ordinary potential relays adapted to respond to the application, to the energizing circuits therefor, of the voltage available at the previously identified 20-volt tap 201 of the auto transformer AT. Relay CRAA may be an ordinary potential relay designed to respond to the voltage available, across its energizing circuit, from an intermediate tap 270 on the auto-transformer AT, and which tap may have a potential of approximately 125 volts, and relay CR24 may be similar, having a pick-up voltage above 20 volts but below 125 volts. Relays CR6, CR13, CR18, CR21, and CR22 are designed to respond to the approximate 5-volt output of the corresponding saturable reactors, and the series motor relay CR4 is, of course, designed to respond to the current flowing in the tractor motor circuit during operation of the latter.

The remaining relays CR8, CR9, CR14, and CR15 are selective relays and have voltage response characteristics determined in accordance with the siding switches and destinations with which they are associated, all as is described in more detail below.

Considering first the operations of starting a carrier, causing it to travel along a main line, operate a selected siding switch, and stop at a destination thereon, it is noted that the carrier diagrammatically indicated in Fig. 10B may, for purposes of the present description, be considered as standing at rest at some point on the track r3' (Fig. 11) in advance of the siding switch SS leading to siding r2. As will be evident, the siding switch shown in Fig. 10A may correspond to said switch SS, and the destinations in Figs. 10B and 10C represent destinations along siding r2.

Assuming the disconnect switch DS, illustrated in Fig. 10B, on such carrier is closed, an obvious energizing circuit for the auto-transformer AT is completed, which extends from the power bus X through the corresponding collector 40, conductor 200, auto-transformer AT, and conductor 202 and collector 42 to the return bus Y. All other carrier-mounted circuits, as well as the other circuits shown in Figs. 10A and 10C, however, remain as illustrated.

Assuming it is desired to start the illustrated carrier, the start button 100 may be momentarily closed, thereby completing a circuit from the tap 201 of the auto-transformer (which may, for example, be a 20-volt tap), through the start button, and thence through the coil of the starting relay CR1 and conductors 204 and 206 and 208 and 202 to the return bus Y. Upon being thus energized, relay CR1 moves to the closed position, closing its contacts *a* and *b*. Closure of contact *b* completes a self-holding circuit for relay CR1, which parallels the start button 100, but is subject to the stop button 102. Closure of contact *a* of relay CR1 completes an energizing circuit for the motor relay CR2, which extends from the power bus X, through conductors 200 and 210, normally and now closed contact *a* of the protective control relay CR3, contact *a* of control relay CR1, the coil of relay CR2, and thence through conductors 206, 208, and 202 to the return bus Y. Upon completion of this circuit, the motor relay CR2 closes its sole contact and completes an obvious circuit for the tractor motor TM, which circuit includes conductors 200, 212, 208, and 202. Upon completion of this circuit, the tractor motor starts the carrier along the main track R toward the siding switch of Fig. 10A.

The tractor motor circuit includes, in series therewith, a control relay CR4 which, simultaneously with the starting of the tractor motor, closes its contacts *a* and *c* and opens its contacts *b* and *d*. It will be appreciated that relay CR4 remains energized so long as the tractor motor is in operation and occupies the illustrated position so long as the tractor motor is at rest.

The action of contacts *b, c, d* of relay CR4 is without effect on the operations now being described, but closure of contact *a* of relay CR4 connects the leading control collector LC to the 20-volt tap 201 of the auto-transformer AT through a circuit which extends from such tap, through conductors 220 and 222, series connected normally closed back contacts *b* of the selecting relays CRB and CRA, conductor 224, normally and now closed back contact *c* of relay CR3, conductor 226, the coil of a current responsive protective relay CR5, a small current limiting resistor 228, and contacts *a* of relay CR4 and conductor 230 to the leading control collector LC. When actuated, relay CR5 functions through relay CR3, to bring the associated carrier to rest, much as described in connection with protective relay PFC of Fig. 5B.

As is pointed out above, relay CR5 is preferably of a low impedance, high current type, and requires substantially the full 20 volts of the low voltage tap 201 for operation. As appears hereinafter, all circuits through which voltage is impressed across relay CR5 are such that relay CR5 receives sufficient voltage to operate it only in the event the leading control collector LC runs onto a section of the control bus which is directly connected to the return bus Y. Since the associated protective relay CR3 is actuated only in response to an actuation of relay CR5, it will be appreciated that the protective relay CR3 is energized only in the event the leading control collector LC encounters a section of control bus which is directly connected to the return bus Y. These conditions obtain only in the event the carrier in question too closely approaches a moving or stopped leading carrier or approaches a track switch which is not in condition to receive it.

All circuits completed by engagement of the leading control collector LC with a section of control bus (except when the carrier is stopped), of course, include the coil of relay CR5 and the resistor 228 (which may have a resistance value of, for example, approximately 10 ohms). Any instrumentalities, such as the hereinafter identified relays and the saturable core transformers, which are intended to be effectively energized by such engagement of the leading collector LC, are high in impedance, compared to the impedances of said elements CR5 and 228, and consequently, a sufficient portion of the potential applied across the complete circuit is available to such instrumentality to effectively energize the latter. Accordingly, in the foregoing recital of the operating characteristics of the various relays and contactors and saturable core transformers, the required operating voltage are given in terms of the voltages which are applied across the circuits through which such instrumentalities are intended to be actuated.

As in the case of the first embodiment, the selection of a destination may be made before or after the carrier has been started. Ordinarily, such a selection is made before the carrier is started. For example, the destinations shown in Figs. 10B and 10C are designated as 2A—2B and 2A—1B. It will be understood that these destinations may be located on siding *r2* of Fig. 11, for example, and, as illustrated, are the last two destinations on such siding. To dispatch the carrier to the illustrated destination 2A—1B, accordingly, buttons 2A and 1B may be moved to the illustrated closed positions. These operations are preparatory only and no operating circuits are completed thereby, since neither of the selecting relays CRA and CRB have yet been operated.

As the carrier approaches the siding switch shown in Fig. 10A, the leading control collector LC passes without effect across what may be called the delaying section C30 of the control bus C, and encounters the blocking section C31 of such control bus. When the collector LC encounters section C31, a series of operations is initiated which results in energizing the A selecting relay CRA, thereby impressing upon the leading control collector a potential corresponding to the operated A selecting button 2A, which action conditions the carrier to operate any siding switches necessary to direct it onto the siding containing or associated with the destination to which the carrier has been dispatched by closing dispatching buttons 2A and 1B.

More particularly, when the leading control collector LC encounters the section C31, an energizing circuit is completed for the saturable core transformer ST1. It will be recalled from previous description that under the conditions stated, collector LC is connected to the positive bus X through the 20-volt tap 201 of the auto-transformer AT. From such control collector LC the circuit for transformer ST1 extends through the section C31, the primary winding of transformer ST1, and thence through conductors 246 and 248 to the return bus Y. Since transformer ST1 is operatively responsive to any voltage, applied to its energizing circuit, between the minimum or 20-volt value and the maximum or 230-volt value, it supplies energizing current to control relay CR6 of a sufficient value to cause this relay to close. Closure of relay CR6 completes an energizing circuit for relay CR7 which extends from the power bus X through conductors 252 and 254, contact *a* of relay CR6 and thence through the coil of relay CR7 and conductors 246 and 248 to the return power bus Y. Upon being energized, relay CR7 opens its back contact a and closes its front contact b. The former action is without immediate effect, but closure of contact b directly connects the delaying section C30 to the return bus Y through conductors 248, 246, 260, and 262.

As is described in more detail below, this return connection for section C30 serves to stop any following carrier as soon as the leading control collector LC thereof encounters the section C30. Additionally, such return connection for section C30 causes energization of the auxiliary A selecting relay CRAA for the present carrier, the circuit being as follows: From the power bus X through the carrier mounted collector 40, conductor 200, the portion of the auto-transformer AT between taps 240 and 270, conductor 272, normally and now closed contact c of the B selecting relay CRB, conductor 274, back contact c of the auxiliary selecting relay CRBB, the coil of the auxiliary selecting relay CRAA, and thence through conductor 275, and now closed normally open contact c of the series relay CR4, to the trailing control collector TC, which, under the conditions mentioned, is connected to the return bus Y through control bus section C30. The just-mentioned circuit supplies sufficient energizing current to the auxiliary selecting relay CRAA to cause operation thereof, it being assumed, by way of example, that such relay requires an applied voltage of 110 volts and that tap 270 is at a potential of 125 volts. Upon being energized, relay CRAA closes its contact a and opens its interlock contact b, which latter contact is without effect at present. Closure of contact a of relay CRAA completes an energizing circuit for the A selecting relay CRA which extends from the 20-volt tap 201 of the auto-transformer AT, through conductors 220 and 222, normally and now closed back contact e of relay CRB, the coil of relay CRA, contact a of relay CRAA and conductor 208 to the return bus Y. Upon being energized, relay CRA completes a self-holding circuit for itself through its contact c, which circuit is, however, subject to the now closed back contact b of relay CRBB.

The opening of contact d of relay CRA is without immediate effect, but the transfer action of contacts a and b disconnects terminal 223 from the 20-volt tap 201 of the auto-transformer and connects the same to the tap 242 which corresponds to the operated A selecting button 2A. The just-mentioned connection extends from such tap 242 through conductor 278, normally and now closed back contact c of the auxiliary control relay PZC and thence through conductor 244 and contact a of relay CRA to the terminal 223. The operation of the selecting relay CRA thus causes a potential corresponding to the operated A selecting button 2A to be impressed upon the leading control collector LC, instead of the normal or starting potential of 20 volts from tap 201. Such action conditions the carrier now being described to operate any switches which are needed to direct the carrier on the siding corresponding to button 2A.

It will be noted also that circuits needed to effect such operation of the selecting relay CRA are completed each time a carrier approaches a siding switch leading from the main line onto a siding, thus insuring that the carrier-mounted elements are in condition to effect the necessary A selections.

Shortly before the leading control collector LC passes out of engagement with the control bus section C31, the trailing collector TC passes out of engagement with section C30 and into engagement with section C31. The disengagement from section C30 is without effect upon the operation now being described, except to interrupt the circuit for the auxiliary selecting relay CRAA which thereupon resumes the illustrated position without effect (in view of the previously-described holding circuit for relay CRA).

As soon as the leading collector LC encounters the control section C33, a circuit is completed for applying potential to the coils of the selective relays CR8 and CR9, which energizing potential corresponds to the now closed carrier-mounted A selecting button 2A. Relay CR8 serves to prevent closing of the switch by previously by-passed carriers, as described below, and accordingly, its operation need not be described in connection with the example now being given, except to note that it is not operably responsive to the voltage afforded by the tap corresponding to the operated button 2A.

In the example now being given, it is assumed that the carrier is to enter the siding being approached, in which event it will be understood that relay CR9 is operatively responsive to the voltage corresponding to the operated button 2A.

The operating circuit for relay CR9 extends from the power bus X, through the previously traced circuit to the leading collector LC and thence through section C33, conductor 280, normally and now closed contacts a of relay CR7, CR8, and CR10, and thence through the coil of relay CR9 and conductors 282 and 248 to the return bus Y.

Upon being so energized, relay CR9 closes its contact a and opens its back contact b. The action of the latter contact is without immediate effect, but closure of its contact a completes a circuit for the coil of the closing contactor CMS which extends from the positive bus X through conductor 252, contact a of relay CR9 and contact a of the now closed limit switch SLS1, and thence through the coil of contactor CMS and conductors 284 and 248 to the return bus Y. Upon being energized, contactor CMS completes a conventional and obvious circuit for the switch motor, in a direction to cause the latter to move the switch to the closed position, which action, as appears from Fig. 4, also moves the control sections C35 and C36 to the dotted line position.

As soon as the switch-closing movement is completed, limit switch SLS1 is opened, interrupting the circuit for the closing contactor CMS and stopping the switch motor. As soon, also, as the leading collector LC passes out of engagement with the activating section C33, the circuit for the selective relay CR9 is interrupted, which action is without effect upon the operation now being described. The switch-activating section C33 can be as short as desired, it being only necessary that this section be long enough to permit the switch-closing movement to take place while the leading collector LC is traversing the section C33. Assuming such movement is completed, the engagement of the leading collector with section C34 is without effect upon continued movement of the carrier now being described. Assuming, on the other hand, that the switch movement does not take place as promptly as usual, and that it is not completed by the time collector LC encounters section C34, the carrier is automatically stopped. More particularly, under such circumstances section C34 is directly connected to the return bus Y through a circuit which extends through conductors 248, 282, the now closed contact a of limit switch SLS2 (which closes as soon as the switch in question moves away from the fully open position), and thence through the still closed contact b of limit switch SLS1, and conductors 292 and 294 to the section C34. Upon encountering the section C34, with such return circuit completed, the carrier is stopped by action of its protective relays CR5 and CR3.

More particularly, and reverting to Figure 10B, it will be recalled that the leading control collector LC is connected to the auto-transformer tap 242 (corresponding to the operated A selecting button 2A through a circuit which includes the operating coil of the protective relay CR5). When the collector LC becomes directly connected to the return bus Y through the section C34, substantially the full potential of said tap 242 is impressed across the coil of relay CR5. As pointed out hereinafter, relay CR5 is operably responsive to an impressed voltage as low as that corresponding to the minimum or 20-volt tap 201 of the auto-transformer. Consequently, it responds to completion of the just-traced circuit and promptly closes its sole contact a. Upon being closed, contact a of relay CR5 completes a circuit for the coil of relay CR3 which extends from the 20-volt tap 201 on the auto-transformer, through conductors 220, 222, and 232, the coil of relay CR3, contact a of relay CR5, and thence to the return bus Y as previously traced, for the coil of relay CR5. Upon completion of this circuit, relay CR3 moves to the open position, opening its contacts a and c, and closing its contacts b. Closure of contacts b completes a holding circuit which parallels contacts a of relay CR5, and the opening of contacts c of relay CR3 interrupts the energizing circuit for relay CR5. The energization of relay CR5 is, accordingly, momentary only.

The opening of contacts a of relay CR3 interrupts the previously traced energizing circuit for the tractor motor contactor CR2, which consequently opens, de-energizing the tractor motor TM, and stopping the carrier. Such action does not alter the energized condition of the motor starting relay CR2, which responded to the start button 100. Consequently, as soon as the return connection for the switch section C34 is interrupted (as by completion of the switch closing movement), the energizing circuit for relay CR3 is interrupted and it resumes the illustrated de-energized position, recompleting the circuit for the motor contactor TM. The latter action restarts the carrier along control section C34, towards the switch.

It will be recognized that, depending upon which of the A or B selecting buttons is operated and which of the A or B selecting relays CRA or CRB is effective at the time, the potential which is momentarily impressed across relay CR5 when the leading collector LC encounters a control section which is directly connected to the return bus Y, may fall anywhere between (in the present example) 27 volts and 230 volts. At the higher voltages, the current flow in the just-traced circuit is at a comparatively high value, but, being momentary only, is readily handled by relay CR5 and the other elements of the associated circuit. As pointed out above, however, relay CR5 is of such low impedance, in relation to the impedance of the other impedance elements with which it may be connected in series by action of the control collectors, that relay CR5 receives sufficient voltage to operate it only in the event an associated control collector encounters a section of control bus which is directly connected to the return bus Y. In the example now being given, it may be assumed that the proper switch operation has been effected, in which event the carrier movement is continued.

In the example now being given, it is assumed that there is no carrier on the siding r2 ahead of the carrier in question. Consequently, the carrier traverses control section C38 without effect. Similarly, the leading collector traverses a short selecting section C39 without effect. When the trailing collector TC encounters the section C39, a series of operations is initiated, which de-energizes the A selecting relay CRA and energizes the B selecting relay CRB, thereby impressing upon the leading control collector LC a potential corresponding to the destination selected, which, in the example now being given, is assumed to be the destination 2A—1B (Fig. 10C).

More particularly, except as hereinafter noted, each siding is provided, adjacent its entering end, with a B selecting control comprising a relay CR14, the coil whereof is connected between the return bus Y and a section C40 of the control bus C, which section preferably has a length slightly in excess of the spacing between the collectors LC and TC. Each relay CR14 is operably responsive to a voltage slightly below that required to operate the relay CR9 for the corresponding siding switch. Consequently, when the leading control collector LC of the carrier in question encounters control bus section C40, the corresponding relay CR14 is energized and closes its sole contact, thereby completing an obvious energizing circuit for the primary winding of an associated control transformer 302, which, in the illustrated arrangement, may have a one-to-one ratio. One terminal of the secondary winding of each transformer 302 is directly connected to ground (it being assumed in the present instance that the return bus Y is not grounded), and the other terminal of such secondary winding is connected to a short control section C39. It will be appreciated that the monorail track r itself may serve as the ground connection for such transformer terminal. In view of the above-mentioned length of section C40, the trailing control collector TC encounters section C39 while transformer 302 is energized, and thereby completes a circuit for energizing the carrier-mounted auxiliary-selecting relay CRBB. This circuit extends from the carrier-mounted terminal 310 (which is connected to rail r through one of the tractor wheels 30), through the coil of relay CRBB, conductor 275, now closed contact c of relay CR4, the trailing collector TC, and thence to rail r through section C39 and the secondary winding of transformer 302. The output of transformer 302 is sufficient to energize relay CRBB which thereupon closes its contact a and opens its contact b. The latter action interrupts the previously traced holding circuit for the A selecting relay CRA, deenergizing the latter while the former action completes an energizing circuit for the coil of the B selecting relay CRB. This circuit extends from the 20-volt tap 201 of the auto-transformer through conductors 220, 222, and 232, normally and now closed contact d of relay CRA, the coil of relay CRB, and thence to contact a of the auxiliary relay CRBB, conductor 208, switch DS, and conductor 202 to the return bus Y. Upon being energized, relay CRB completes an obvious holding circuit for itself, through its contact $d$, which circuit is, however, subject to the back contacts $b$ of the auxiliary relay CRAA. Consequently, when collector TC passes out of engagement with control bus section C39, the deenergization of relay CRBB is without effect.

It is believed to be evident that, when energized, relay CRB, at contact $a$ thereof, brings the leading control collector LC to the potential determined by the now closed B selecting button 1B. This action conditions the carrier to stop at any destination locating along the siding in question, having a voltage responsive destination control relay which is operably responsive to the voltage established for control collector LC by the now closed B selecting button 1B; or to operate any sub-siding switch which is responsive to the setting of the operated B selecting button.

Two destinations are shown in Figures 10B and 10C, it being understood that with the illustrated series of ten B buttons, up to ten such destinations can be accommodated therealong. Such destinations are arranged along the siding in descending order of voltage response; that is to say, the destination nearest the siding switch requires the highest voltage setting to operate it, and the last destination requires the lowest voltage of the series. Accordingly, destination 2A—2B is shown in Figure 10B, as being in advance of destination 2A—1B (Figure 1C). As previously mentioned, all such destination controllers may be and preferably are identical, with the exception that the control relays CR15 thereof respond to different voltages corresponding to the voltage settings of the B buttons.

As the carrier in question proceeds along the siding, its leading control collector encounters the control bus section C41 associated with destination 2A—2B and thereupon impresses a voltage corresponding to button 1B upon the coil of the corresponding relay CR15 through an obvious circuit, including conductors 312 and 314. The voltage corresponding to button 1B is, however, too low to cause a response of such relay CR15, and the carrier movement consequently continues without interruption.

When, however, the leading control collector LC encounters section C41 associated with destination 2A—1B, the corresponding relay CR15 is energized and moves to the closed position, opening its back contact $a$ and closing its front contact $b$. The action of contact $a$ is without immediate effect, but the closing of contact $b$ completes an obvious energizing circuit for the associated control relay CR16, which extends between the supply and return buses X and Y through conductors 316 and 318. Upon being energized, relay CR16 closes its contact $a$ and opens its contact $b$. The action of contact $a$ is preparatory only, but the opening of contact $b$ isolates the power bus section X1 from the power bus X. At this time the power collector 40 is in engagement with the section X1, and, consequently, such isolation de-energizes the carrier-mounted power-supply conductors 200 and 202. It is believed to be obvious that such de-energization immediately restores all carrier-mounted circuits to the illustrated conditions and stops the carrier at the destination 2A—1B.

Upon being stopped, the carrier will remain at rest until its start button 100 is again closed, or until the associated circuit is reclosed by automatic means. As in the above-described embodiments, the stopping of the carrier may serve to initiate any desired series of automatic control operation such as hoisting, dumping, and the like, and may also serve to establish an A and B selector setting which is effective to cause the car to return to a desired home station.

With respect to these automatic operations, it will be noted that the de-energization of all carrier-mounted circuits also interrupts the energizing circuit for relay CR15 which thereupon resumes the illustrated de-energized position, interrupting the circuit for relay CR16 and initiating a return to the de-energized position of the latter. As indicated by the legend in Figure 10C, relay CR16 is of the slow return type, and consequently its contact $a$ remains closed for a short interval after contact $a$ of relay CR15 resumes the closed position. During this interval, a circuit is completed for energizing the carrier-mounted auxiliary control relay PXC. This circuit extends from the power bus X through conductor 316, contacts $a$ of relays CR16 and CR15, conductor 320, section C41, the leading control collector LC, conductor 230, the coil of relay PXC, now closed back contact $d$ of relay CR4, and thence to the return bus Y to conductors 208 and 202.

Upon being energized, relay PXC closes its contact $a$, thereby connecting the terminals 330 together. It will be appreciated that the last-mentioned connection may serve to actuate conventionally arranged hoisting, dumping, or other control apparatus not shown herein. Such apparatus may, of course, respond to a momentary closure of relay PXC which, as indicated, is of the slow return type.

At the expiration of the interval during which the contacts $a$ of both destination relays CR15 and CR16 are closed, contact $a$ of relay CR16 reopens, interrupting the energizing circuit for relay PXC. Additionally, contact $a$ of relay CR16 recloses, reconnecting the power bus section X1 to the power bus X, and re-energizing the carrier-mounted control conductors 200 and 202.

Relay PXC remains closed for a short interval after such re-energization of section X1; and, during this interval, a circuit is completed for the coil of the auxiliary redispatching relay PZC which extends from the power bus X, through conductor 200, the coil of relay PZC, and thence through conductor 334, contact $b$ of relay PXC, and conductors 332, 204, 206, 208, and 202 to the return bus Y. Upon completion of this circuit, relay PZC moves to the closed position and completes a self-holding circuit for itself through its contact $e$. The opening of contacts $a$ and $c$ of relay PZC disconnects the previously operated buttons 2A and 1B from the associated circuits leading to the control collector LC. The closure of contacts $b$ and $d$ of relay PZC connect the associated terminals 336 and 338 to conductors 244 and 245 leading to the control collector LC. It will be appreciated that terminals 336 and 338 may be connected to the auto-transformer AT at points corresponding to desired ones of the A and B buttons respectively. When so connected, terminals 336 and 338 have the obvious effect of establishing corresponding A and B selector settings.

Completion of the operations caused by energization of terminals 330 by relay PXC may also serve to momentarily close a pair of contacts 340, in parallel to the starting button 100, so that such completion serves to automatically restart the carrier towards the home destination.

As before, also, each destination is provided with a transfer switch 342 which, when open, eliminates the automatic operations provided by the auxiliary relays PXC and PZC, and it is, of course, preferred to maintain such switch 342, associated with the home destination, in an open condition. Transfer switches 101, 103, and 105 may also be provided for the purposes described in connection with Figs. 5A, 5B and 5C.

It will be recognized, of course, that if the automatic redispatching and restarting functions are eliminated, the carrier will remain at rest at the destination 2A—1B until it is restarted by closure of the starting button 100. When so started, it will proceed to whatever destination is established by reclosure of a desired pair of the A and B buttons. Any suitable means may, of course, be provided to reset the operated buttons. For example, closure of any open button in the A or B series, respectively, may serve to open any previously closed buttons of the corresponding series, and, preferably, an operated A or B button can be reset only by closing another A or B button, respectively. Thus, at all times, one A button and one B button are in closed condition.

Considering now the operations of causing the carrier in question to pass off of the indicated siding through an exit switch, it will be appreciated that the restarting thereof may be effected in the previously described manner by closing either the start button 100 or the contacts 340, which action energizes the tractor motor TM, and, pending closure of the A selecting relay CRA, impresses upon the leading control collector LC, the minimum or 20-volt potential of the tap 201. For example, it may be assumed that buttons 3A and 3B are closed as an incident to the starting operation, thereby preparing circuits to establish corresponding potentials on the leading control collector LC. Alternatively, it may be assumed that automatic redispatching terminals 336 and 338 are set to establish a corresponding destination selection.

As the carrier proceeds along the siding towards the exit switch, the leading control collector LC encounters the control bus section C42 and thereupon completes a circuit for energizing the switch closing relay CR17. This circuit extends from the auto-transformer terminal 201, as previously traced, to the leading control collector LC, and thence through conductor 350, the coil of relay CR17, and conductors 352 and 354 to the return bus Y. Relay CR17 is responsive to the voltage established at tap 201 and consequently assumes the closed position, opening its back contacts $a$ and $b$ and closing its front contacts $c$ and $d$.

The action of contact $a$ serves only to prevent energization of the opening contactor OME, and the action of contacts $b$ and $d$ is concerned with preventing interference between carriers, which action is described hereinafter. Closure of contact $c$ of relay CR17 completes an energizing circuit for the closing contactor CMS which extends from the power bus X through conductors 356 and 358, the coil of contactor CME, now closed contact $a$ of limit switch ELS1, and contact $c$ of relay CR17 to the return bus Y, through conductors 352 and 354.

Upon being energized, contactor CME energizes the switch motor EM in a direction to cause it to close the corresponding exit switch, at the conclusion of which operation limit switch ELS1 opens, de-energizing the switch motor.

When the leading collector LC passes out of engagement with the section C42, the above described energizing circuit for the switch relay CR17 is interrupted, and this relay resumes the illustrated position, without effect, in view of the now open condition of limit switch ELS1.

After the disengagement of section C42, the leading collector engages section C43. If the switch closing action has been completed prior to such engagement, such engagement is without effect and the carrier continues around the switch. If, on the other hand, the switch closing movement has not been completed, such engagement connects the leading collector LC to the return bus Y through a circuit including conductor 360, the still closed contact $b$ of limit switch ELS1, conductors 362 and 365, now closed contact $b$ of limit switch ELS2 and conductor 364 to the return bus Y. It will be recalled that limit switch ELS1 remains closed until the switch closing movement has been completed and that limit switch ELS2 closes at the beginning of the switch closing movement. Upon completion of the above return circuit, the carrier in question is stopped in accordance with previous description and is maintained at rest until the return circuit is cleared, as by completion of the switch closing movement, thereby opening limit switch ELS1.

In the operation now being described, the leading control collector passes, without effect, out of engagement with control bus section C43, and also traverses control bus sections C44 and C45 without effect, it being recognized that sections C44 and C46 are carried by and movable with the track switch operating slide.

When the leading collector LC encounters the control bus section C47, circuits are completed for the primary winding of the previously identified saturable core transformer ST4, and for the coil of relay CR24 which circuits extend from section C47 through the primary winding of such transformer and the coil of relay CR24 and thence through contact $a$ of limit switch ELS2 and conductor 364 to the return bus Y. It will be recalled that under the conditions mentioned the leading control collector LC is connected to the 20-volt tap on the carrier-mounted auto-transformer AT and that transformer ST4 is operably responsive to such an applied potential, but that relay CR24 is not responsive to such voltage, and remains unoperated. Accordingly, transformer ST4 energizes its associated control relay CR18 which thereupon closes its sole contact $a$ and energizes relay CR19, through a circuit which extends from the power bus X through conductors 356, 366, and 368, contact $a$ of relay CR18, the coil of relay CR19, contact $a$ of limit switch ELS2 and conductor 364 to the return bus Y. In turn, upon being energized, relay CR19 completes an energizing circuit for the opening contactor OME, which circuit extends from the power bus X, through conductor 356, now closed contact $a$ of the switch closing relay CR17, the coil of contactor OME, contact $a$ of relay CR19, and thence to the return bus Y as previously traced by the coil relay CR19.

Upon being energized, contactor OME energizes the switch motor EM in a direction to cause it to move the switch to the illustrated open position, at which time limit switch ELS2 opens, de-energizing contactor OME, relays CR18 and CR19, and transformer ST4.

The operations above described enable the carrier in question to leave the illustrated siding $r2$ and the track section $r2'$. Passage from section $r2'$ to the main line $r$ is effected in the above described manner, by operation of the corresponding exit switch ES.

It is believed to be evident that the carrier will proceed along the main line (in the absence of interference with other carriers, described hereinafter), until it approaches a siding switch. Upon such approach, the leading control collector LC again encounters a control section C31 as described with reference to Figure 10A, which action serves to energize the A selecting relay CRA and impress upon the leading control collector LC a potential corresponding to the then operated A button (in this case button 3A). Each time also that the leading control collector encounters the switch activating section C33 for a siding switch, a circuit is again completed for the voltage responsive relay CR9 corresponding to such siding switch. If the potential of the leading control collector, as determined by the A setting, is high enough to operate such relay, a switch action is initiated. If, on the other hand, the voltage of the leading collector LC is too low to operate the corresponding relay CR9, no switch closing circuits are completed and the carrier passes by the switch in question.

In accordance with the present embodiment, the voltage responsive relays CR9 for a succession of sidings, distributed along the main line as in the manner indicated in Figure 11, are arranged in descending order of voltage response in the direction in which the carrier approaches such siding switches; that is to say, with reference to Figure 11, the voltage responsive relay for the siding switch leading to siding $r1$ would require a minimum operating voltage corresponding, for example, to the setting of button 1A; the voltage responsive relay for the siding switches corresponding respectively to sidings $r2$ and $r3$ in turn might correspond to the settings of buttons 2A and 3A; and the voltage responsive relays for additional sidings such as $r6$, $r7$, $r8$, $r9$, and $r10$ would require successively higher operating voltages. These relationships are indicated in the simplified track layout of Figure 11, and it will be appreciated, accordingly, that as the carrier in question, under way to destination 3A—3B, successively approaches the siding switches leading to sidings $r10$, $r9$, etc., the leading control collector LC completes previously traced circuits tending to energize the selective relays CR8 and CR9 associated with such siding switches. The selective relays for all siding switches in advance of siding $r3'$, however, require higher voltages than are established by the operated button 3A, however, and consequently the carrier in question does not serve to close any of the corresponding siding switches.

It will be noticed that siding $r3'$ is common to each of sidings $r3$ and $r2$ and that, consequently, a carrier under way to either of the last-mentioned two sidings is required to operate the siding switch leading into siding $r3'$. In accordance with the preferred practice of the invention, this operation is accomplished by providing, at the siding switch SS leading to siding $r3'$, a selecting relay CR9 which is operably responsive to the control voltage corresponding to the A buttons which are individual to all of the sidings to which the siding $r3'$ is common; that is, the relay CR9 for siding $r3'$ will, by being responsive to the lowest A setting represented by the common sidings, also respond to the A settings represented by the other common sidings. Similarly, the companion selecting relay CR8 for the siding switch leading to the siding $r3'$ requires an operating voltage which is above the highest A setting associated with any of the sidings to which the siding $r3'$ is common. As a consequence, a carrier approaching the siding switch leading to siding $r3'$, and destined for either of sidings $r2$ and $r3$ is effective to operate such siding switch, in the previously described manner, and enter the siding $r3'$. On the other hand, the relays CR8 and CR9 for the sidings $r3$ and $r2$, respectively, are set to respond and provide a switch closing operation only in response to closure of the corresponding individual buttons 3A and 2A. Thus, a carrier will enter siding $r3$ only if button 3A is closed and will enter siding $r2$ only if button 2A is closed. In the example now being given, button 3A is closed and consequently the carrier enters siding $r3$ in the previously described manner.

In view of the fact that the sidings to which siding $r3'$ is common each contain a plurality of destinations requiring similar B settings, the A setting should be maintained on the leading collector LC until the carrier has entered the siding containing the destination to which the carrier has been dispatched. Consequently, no B selector control is encountered immediately following the siding switch leading onto siding $r3'$. Such B selector controls are, however, provided just beyond the siding switches leading to the sidings $r3$ and $r2$. Consequently, shortly after entering siding $r3$, the carrier approaches a B selector control (relay CR14—transformer 302) and operates the same in the previously described manner, energizing the B selecting relay CRB and establishing the leading collector LC at a potential corresponding to the operated B button, in this case, B. As before, the carrier passes all destinations along siding $r3$ which require a higher operating voltage than is afforded by closure of button 3B and the carrier comes to rest at destination 3A—3B.

As in the first embodiment, certain track layouts may employ a siding which is common to two or more sub-sidings, but which sub-sidings either have only a single destination thereon or have so few destinations thereon that all of the destinations on all of such sub-sidings may correspond to respectively different buttons of the B series. Such a condition is illustrated in Figure 11 by siding $r5$ and the two sidings $r5a$ and $r5b$ which lead therefrom. To accommodate such an arrangement, the siding switch SS leading to siding $r5$ may be individually responsive to button 5A and the siding switches leading to sub-sidings $r5a$ and $r5b$ and the destinations on such sidings, respectively, may, for example, be individually responsive to buttons 5B and 4B. Thus, a carrier having passed on to siding $r5$ is caused to operate a B selector control (relay CR14—transformer 302) before it encounters siding $r5a$. With the B setting established, the carrier will enter siding $r5a$ or $r5b$, and stop at the destination thereon, depending upon whether button 5B or 4B has been closed.

As is pointed out below, carriers are automatically caused to pass, without entering, the siding switch corresponding to any siding which is not in condition to receive such carrier. Such a by-passed carrier should continue traveling until it again approaches the siding in question. As in the first embodiment, it is desirable to provide short cuts for such a by-passed carrier so that it is not required to travel the full length of the main track system. Such a short cut is illustrated in Figure 11 by the siding $r5c$, and it will be appreciated from previous description that this siding might be approached by a carrier which has been caused to by-pass any of sidings $r10$ through $r5$. Accordingly, in accordance with the present invention, the selective relays CR8 and CR9 for the siding switch leading to the siding $r5c$ are arranged to cause a switch closing operation in response to the approach of a carrier which has an A setting corresponding to any of buttons 5A through 10A; that is to say, relay CR9 for the siding switch SS leading to siding $r5c$ is responsive to the voltage established by button 5A and is consequently responsive to the voltage established by any buttons having a higher voltage setting. The companion relay CR8, on the other hand, which, as pointed out below, must remain unoperated, in order to enable the carrier to enter siding $r5c$, has a voltage in excess of the voltage corresponding to the highest A button in the series to which siding $r5c$ is common. As a matter of fact, since such common series includes siding $r10$, the relay CR8 for the controller associated with the switch SS leading to siding $r5c$ might be omitted.

It is believed to be evident that the carrier will pass along the siding $r5c$ without stopping, will re-enter the main line $r$, and will thereafter re-approach the series of by-passed sidings and, assuming the siding to which it is dispatched is in shape to receive it, the carrier will enter such siding and stop at the destination thereon corresponding to the operated B button. Other short cut sidings may, of course, be provided but are not shown, for simplicity.

It will be recalled from the original description of the operation of Figure 10A that the carrier in question, though completing circuits which were effective to close this switch, did not reopen the same after passing therethrough. Accordingly, if a following carrier also destined for the siding shown in Figure 10A, encounters the still closed switch, no movement thereof is involved and the carrier simply passes therethrough. In approaching the switch, such carrier does operate the voltage responsive relay CR9, but this action does not energize the closing contactor CMS, in view of the fact that when the track switch is closed, limit switch SLS1 is open.

Considering now the case of a carrier which is traveling on the main line of Figure 10A and is under way to a destination located on a siding which is beyond the siding switch shown in Figure 10A, if such carrier finds the switch in an open condition it passes directly therethrough because its A setting is too low to operate the associated relay CR9. If, on the other hand, such a carrier finds the switch in a closed condition, it causes the same to open as a consequence of the following series of operations. When the leading control collector LC encounters section C33, it tends to energize relay CR9 as before but, as stated above, does not have a sufficiently high potential to do so. Such engagement does, however, energize the saturable core transformer ST2 associated with the switch opening contactor OMS, which circuit extends from control bus section C33 through back contact $a$ of the now de-energized relay CR7, now closed back contact $b$ of the voltage responsive relay CR9, and thence through the primary winding of transformer ST2 and conductors 247 and 248 to the return bus Y. Upon being energized, transformer ST2 actuates control relay CR13 which thereupon completes an energizing circuit for the coil of relay CR12 which extends from the power bus X, through conductors 252, 370, and 372, contact $a$ of relay CR13 and thence through the coil of relay CR12 and conductors 247 and 248 to the return bus Y. Upon being energized, relay CR12 closes its contacts $a$ and $b$. Closure of contacts $b$ completes an energizing circuit for the switch opening contactor OMS which extends from the power bus X through conductors 252 and 370, the coil of contactor OMS, contact $b$ of relay CR12, conductor 374, now closed contact $b$ of limit switch SLS2, and thence through conductors 282 and 248 to the return bus Y. When so energized, contactor OMS causes the switch motor SM to restore the switch to the open position. When the switch reaches the fully open position, switch OMS is de-energized by the opening of limit switch SLS2. If, as before, the switch opening movement is not completed by the time the leading collector LC encounters section C34, such collector is connected directly to the return through the series connected limit switches SLS1 and SLS2, which return connection stops the carrier and holds it at rest until the switch opening operation is completed.

As is pointed out above in connection with the short-cut siding $r5c$, Figure 11, a carrier which is destined for a siding which is not in condition to receive it should by-pass the corresponding siding switch (so as not to obstruct the movements of following carriers), and continue traveling until it again approaches the siding in question. As is described below, section C38, Figure 10A, serves as a congestion section, and if a leading carrier stops with its trailing collector TC in engagement therewith, any following carrier should be caused to by-pass the switch, even though under way to the following siding. Referring again to Figure 10B, it will be noticed that so long as a carrier is at rest, its trailing collector TC is directly connected to the return bus Y through a circuit which extends from such bus through conductors 202 and 208, contacts $b$ of the series relay CR4 (which are closed while the carrier is at rest) and thence through conductor 389 to the trailing collector TC. Thus, if the collector TC of the leading carrier is stopped on section C38, an energizing circuit for by-pass relay CR10 is completed which extends from bus X through conductor 252, the coil of relay CR10, conductor 382, bus section C38, and thence to the return bus Y through the trailing collector of the leading carrier. Upon being energized, relay CR10 opens its sole contact $a$ and prevents energization of the voltage responsive relay CR9. Under these circumstances, no carrier approaching the siding switch in question is enabled to complete any switch closing circuit. On the other hand, any carrier approaching such siding is enabled to complete the previously described switch opening circuit for transformer ST2, extending from section C33 through conductor 280, contact $a$ of relay CR7, contact $b$ of relay CR9, the primary winding of ST2 and thence through conductors 247 and 248 to the return bus Y. Accordingly, such second or following carrier whether or not destined to enter the siding shown in Figure 10A is caused to reopen the switch, if it is in a closed condition, and pass by the same.

In view of the fact that the voltage responsive relays for the successive sidings are arranged to respond to a descending series of voltages, it will be recognized that a carrier which has been dispatched to a siding in advance of the siding shown on Figure 10A, but has been caused to by-pass the corresponding switch, will have its leading control collector at a voltage which is in excess of that required to operate the voltage responsive relay CR9 for the siding shown in Fig- If the stalled leading collector stops with its trailing collector TC in advance of section C34, a following carrier could advance no farther than to bring its leading collector into engagement with the same control bus section which is engaged by the trailing collector TC of the leading carrier, as will be understood.

Considering now the arrangements for preventing inteference between carriers in the region of the exit switches, and reverting to Figure 10C, it will be recalled that when a carrier approaching the exit switch on the indicated siding engages control section C42, relay CR17 is energized, thereby initiating the switch closing sequence. As soon as the siding switch leaves the fully open position, the main line control bus section C49 is directly connected to the return bus Y through a circuit which extends from such bus Y, through conductor 364, contact b of limit switch ELS2 (which closes at the beginning of the switch closing movement), and conductors 365 and 362 to the control section C49. It will be understood that limit switch ELS2 remains in the closed position until the siding carrier has completely passed through the switch and caused the same to be completely reclosed, in accordance with previous description. Accordingly, any main line carrier which encounters the control section C49 after a switch closing operation has been initiated by a carrier approaching the exit switch on the siding, is caused to stop and remain at rest until the siding carrier has cleared the switch and the latter has been reopened. Contact c of limit switch ELS2 connects section C48 to the return bus Y, thereby affording a second holding connection for such main line carrier.

Assuming that a main line carrier approaches the exit switch shown in Figure 10C, it becomes effective to hold any carriers approaching the same, on the siding, until the main line carrier has cleared the siding. More particularly, assuming that the leading control collector of a main line carrier encounters control bus section C48, a circuit is completed for energizing the associated saturable core transformer ST3. This circuit extends from the leading control collector of the main line carrier (which is at a potential of at least 20 volts) through section C48, conductor 394, the primary winding of transformer ST3, and conductor 396 to the return bus Y. Upon completion of this circuit, transformer ST3 energizes control relay CR21 which thereupon closes its sole contact a and completes an obvious energizing circuit, including conductors 398 and 400 for the coil of relay CR20. Upon being energized, relay CR20 opens its contact a and closes its contact b.

Upon being closed, contact b of relay CR20 directly connects control bus section C42 to the return bus Y through conductors 402 and 400, which connection, in accordance with previous description, is effective to stop and hold at rest any carrier which thereafter encounters section C42. It will be noticed that control bus sections C45 and C46 are jumpered together and that these two sections are normally connected to section C48 through conductors 404 and 406 and contacts d of limit switch ELS2. Consequently, the just-mentioned energizing connection for transformer ST3 is maintained until the main line carrier has entirely cleared section C45, by which time it is permissible for the siding carrier to proceed. It will be recognized that after the leading collector LC of the main line carrier leaves section C45, the energizing circuit for transformer ST3 is maintained by the trailing collector TC until the latter leaves section C45.

A carrier which is passing through an exit switch is also effective to hold any following carrier, traveling on the siding, at the entrance to the siding switch. More particularly, when the trailing collector TC of the leading carrier leaves section C42, all energizing circuits for relay CR17 are interrupted and the latter resumes the illustrated de-energized position. At this time, section C42 becomes connected to the return bus Y through a circuit which extends through conductor 350, contact b of relay CR17, conductor 390, contact a of relay CR20, conductors 392 and 394, section C48, conductor 404, now closed contact c of limit switch ELS2 and conductor 364 to the return bus Y. The just-mentioned return connection for section C42 is, of course, maintained until the leading collector LC of the leading carrier engages section C47 and re-opens the switch. As soon as the switch is re-opened, a new circuit for section C42 is completed which is maintained until the trailing collector TC of the leading carrier passes beyond section C45. More particularly, as soon as the switch re-opens, an energizing circuit for transformer ST3 is completed which extends from the trailing collector of the leading carrier through section C45, conductor 406, now closed contact d of limit switch ELS2, conductor 404, section C48, conductor 394, and through the primary winding of transformer ST3 and conductor 400 to the return bus Y. Upon being energized, transformer ST3 causes closure of relay CR20, which, at contact b, directly interconnects section C42 to the return bus Y. It is noted that there is a very short interval during the movement of limit switch ELS2 from the opposite position to the illustrated position, at the conclusion of the switch opening movement, during which the return connection for section C42 is interrupted, and during which a following carrier may tend to energize relay CR17 and, by completing a return connection for section C48, prevent energization of transformer ST3. Preferably, relay CR17 is made somewhat sluggish in its closing action so as to prevent it from becoming energized during the just-mentioned very short interval.

When the trailing collector of the leading carrier leaves section C45, all return connections for section C42 are removed, enabling the trailing carrier to re-start, and, by energizing relay CR17, to cause a switch closing operation. With the switch closed, and while the trailing collector of the leading carrier is passing over section C47, the latter tends to complete a switch re-opening circuit, by re-energizing transformer ST4. Such an operation is prevented by relay CR24 which, as previously stated, responds to an applied voltage above 20 volts but less than 125 volts. Since the potential of the trailing collector is approximately 125 volts, relay CR24 is energized while collector TC is passing over section C47 and, in view of the open condition of its contact a, prevents completion of a circuit for the saturable core transformer ST4. If such leading carrier stops with its trailing collector TC on section C47, no switch re-opening circuit is completed, since under these conditions section C47 is directly connected to the return bus Y.

Considering now the action of the spacing block, it will be understood that normally the tractor motors for the individual carriers have sufficiently good speed regulation to maintain ure 10A as well as the voltage responsive relays for any other sidings which are further along the line. Such a carrier should not, of course, serve to close the siding switches for the siding of Figure 10A or for any other siding having a lower voltage responsive relay CR9, except a short-cut siding (described above).

Referring further to Figure 10A, it will be recalled that when the leading control collector LC of a carrier engages the sections C33, it momentarily completes energizing circuits for both of relays CR8 and CR9. In connection with each siding switch which should be closable in response to the A setting of only a single A button (for example the siding switch leading to siding r2), the corresponding relay CR8 has approximately the same operating voltage requirements as that of the relay CR9 which is next highest in the voltage series. Under the conditions stated, accordingly, the carrier in question has a sufficiently high voltage impressed upon its leading control collector LC to operate the relay CR8 for the siding shown in Figure 10A, which relay thereupon opens its contacts a and interrupts the energizing circuit for the voltage responsive relay CR9. Consequently, such carrier does not operate relay CR9 and no switch closing operations result. On the other hand, if the switch in question is in an open condition, such by-passed carrier is enabled to close the same by energizing the saturable core transformer ST2 in the previously described manner.

As is outlined above in connection with sidings r3', r3 and r2, certain siding switches are closable in response to A settings established by any series of two or more successive A buttons. The relays CR8 for such siding switches have operating requirements approximately equal to the A setting which is one step higher than the highest A button in such series.

Considering now the general question of interference between carriers, it will be appreciated from the foregoing description that whenever a carrier is stopped, its trailing collector TC is directly connected to the return bus Y through conductors 202, 208, back contact b of its carrier mounted relay CR4 and conductor 380. Also, whenever the leading collector of a carrier encounters a control section which is directly connected to return, such following carrier is brought to rest by the sequential action of its relays CR5 and CR3, and remains at rest until the return connection is removed. A stopped leading carrier at any point along the line is thus effective to stop a following carrier.

With respect to the particular problem of preventing interference between carriers in the regions of the siding switches, the arrangement is such that when a leading or first carrier approaches a siding switch it establishes a return connection for any second or following carrier which holds the latter at a point well in advance of the switch, until the first carrier has entirely cleared the switch either by passing through it or by passing by it.

More particularly, it will be recalled from the initial description of the operation of Figure 10A, that when the leading collector LC of the first carrier encountered the section C31, it energized transformer ST1 which in turn energized relay CR7. While energized, relay CR7 directly connects section C30 to the return bus Y, through its contact b, and conductors 262, 260, 246, and 248. Shortly before the leading collector LC of such a first carrier leaves section C31, such section is engaged by the trailing collector TC. Collector TC is, under the conditions stated, at a potential of approximately 125 volts (tap 270 of auto-transformer AT) and is consequently effective to energize transformer ST1 and maintain relay CR7 energized. Very shortly after collector TC of the first carrier leaves section C31, the leading collector LC encounters section C33 and thereby initiates either a switch-closing operation or a switch-opening operation, as previously described. As an incident to a switch-closing operation, relay CR11 is energized, in parallel with closing contactor CMS. Through conductors 248, 284, 285, and 262, relay CR11 re-connects section C30 to the return bus Y. As an incident to a switch-opening operation, relay CR12 is energized, and through its contact a and conductor 376, connects section C30 to the return bus Y. As soon as the leading collector LC of the first carrier encounters section C34, it re-energizes transformer ST1 and consequently re-energizes relay CR7, thereby re-establishing the initial return circuit for section C30. The trailing collector TC is also able to energize transformer ST1, and consequently relay CR7, through section C34.

It will be noticed that sections C34, C35, C36, and C37 are jumpered together. Consequently, until the trailing collector TC of a carrier which has moved through the switch passes out of engagement with section C37, or until the trailing collector TC of a carrier, which has moved by the switch has passed out of engagement with section C35, the return connection for section C30 is maintained. Such disengagements by the trailing collector TC do not take place until the carrier in question has entirely cleared the switch, rendering it safe for a second or a following carrier to proceed towards the switch. If such leading carrier is stopped before its trailing collector TC clears the congestion section C38, relay CR10 operates as described above and prevents the following carrier from moving through the switch. The relative lengths of the control segments are such that even though the following carrier starts as soon as the collector TC of the leading carrier leaves section C37, such leading carrier, if it stops on section C38, will be able to operate relay CR10 before the following carrier encounters the activating section C33.

In the remote instance in which a leading carrier is stopped when it reaches section C34 (because the switch is in an intermediate position), the holding connection for the following carrier is transferred from section C30 to section C31. More particularly, with the switch in an intermediate position, section C31 is directly connected to return through conductors 294 and 292, contact b of limit switch SLS1, contact a of limit switch SLS2 (both of which are closed in the intermediate switch position), and thence through conductors 282 and 248 to the return bus Y. Both the leading and the following carriers, of course, remain stopped until the faulty switch condition is cleared as by an attendant, which clearance enables both carriers to re-start. It will be appreciated, of course, that the attendant will hold the following carrier at rest until the leading carrier has cleared the switch area.

Section C31 also serves as a holding section in the event a leading carrier stops in the switch area, due to failure of its power supply, and with its trailing collector on any of sections C34, C35, C36, or C37. Such a stoppage directly connects C31 to the return bus Y through conductor 294.

substantially uniform operating speeds of the several carriers, independently of normal variations in the loading thereof. Proper spacing between the carriers is, of course, initially established at the home dispatching station, and the automatic operations which take place at the siding and exit switches also tend to maintain proper spacing. The spacing controllers such as 410 in Figure 10C, however, serve to insure the maintenance of a proper spacing between carriers and it will be recognized that these spacing controls may be introduced at one or more points along the system, usually on the main line. Referring particularly to Figure 10C, each spacing controller 410 includes a saturable core transformer ST5, having characteristics like those described in connection with transformers ST1, etc., and a pair of cooperating control relays CR22 and CR23. Assuming that a carrier encounters section C50, transformer ST5 is energized, since the leading collector of such carrier is at a potential of at least 20 volts. When energized, transformer ST5 energizes relay CR22, which, in turn, energizes relay CR23. When energized, relay CR23 directly connects the immediately proceding portion of the control bus C51 to the return bus Y. The just-mentioned energizing connection for transformer ST5 is maintained until the trailing collector TC passes out of engagement with section C50, and it will be understood that the distance behind the actuating carrier at which a following carrier is held will depend upon the lengths of sections C50 and C51.

It will be noted that the above return connection for section C51 is made while the trailing collector of the leading carrier is in engagement therewith, which action impresses the potential of tap 270 on the carrier mounted auto transformer AT across the A selecting relay CRAA and operates the same in the manner described in connection with the approach to a siding switch. This action establishes an A setting for the carrier and insures that the A setting will be properly made before any siding switches are encountered.

With particular reference to the selection of the potential of tap 270 on the auto-transformer, to which the trailing collector TC is connected, it will be noticed that in passing along jumpered control bus sections, or individual sections which exceed the LC—TC spacing, both such collectors are directly connected together by the engaged bus section. Under these circumstances the maximum potential difference which could be impressed across the A selecting relay CRAA is the full 230 volts of the auto transformer less the 125 volt potential of tap 270; namely, 105 volts, which voltage is not sufficient to operate relay CRAA. Also in the event the leading collector of a following carrier should engage the same control bus section which is engaged by the trailing collector TC of a leading carrier, the maximum potential which could be impressed across a relay CRAA is 125 volts minus 20 volts; namely, a value insufficient to operate a relay CRAA. The selected potential of tap 270 is, consequently, one which prevents operation of any relay CRAA except under desired conditions, namely, those in which the trailing collector TC of the associated carrier is directly connected to the return bus Y.

Referring again to Fig. 10A, certain relays of the system, such as relay CR8, may be initially subjected to operating currents in excess of those which it is desirable to maintain. Protection for such relays, as well as any others employed in the system, may be afforded by the illustrated thermostatic switch elements 420 which, when heated, open, and introduce an associated resistor 422 into the circuit of the associated relay, thereby reducing the energizing current to a desirably low value.

Although only several specific embodiments of the invention have been described in detail, it will be appreciated that various further modifications in the form, number, and arrangement of the parts may be made without departing from the spirit and scope of the invention.

It will be appreciated further that while the invention has been described in connection with a carrier system of a particular type, that the invention may be embodied in a wide variety of other carrier systems, and may also in its more generic aspects, be embodied in a wide variety of systems, other than carrier systems.

What is claimed is:

1. In a control system for a plurality of carriers operable along a predeterminable route along which a plurality of stations are located at each of which a control operation may be performed, a single trolley on at least one carrier which is common to all of said stations, selective control means on said carrier connected to said trolley, a section of conductor for each of said stations disposed to be engaged by said trolley, a station control means for each station connected to the corresponding one of said conductor sections and disposed to be electrically coupled to said control means as the carrier approaches the corresponding station and be actuated by said coupling to effect a said control operation, additional sections of conductor disposed to be engaged by said trolley, additional control means connected to corresponding ones of said additional sections of conductor and disposed to be electrically coupled to said selective control means as said one carrier moves along said route and be actuated by said coupling, and means operably responsive to said last-mentioned actuation for controlling another said carrier.

2. In a control system for a carrier operable along a track having a main section and a plurality of branch sections, a plurality of switches individual respectively to the branch sections, and at least one station on each branch section, the combination of a switch selector and a station selector on the carrier, control means on the carrier for operating the switches in accordance with the setting of the switch selector and for stopping the carrier at stations in accordance with the setting of the station selector, and means to render the said control means responsive to the switch selector but not to the station selector until the carrier has passed at least certain switches leading to the selected branch section and to thereafter render the control means responsive to the station selector but not to the switch selector.

3. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar, control collector means carried by said conveyor and guided to engage said power bus bar substantially continuously and to engage said interposed bus bar means sequentially as the collector means travel, a plurality of distinguishable trackside circuit means located adjacent said stations and electrically connected to respective ones of said bus bar means, conveyor borne circuit means electrically connected to said collector means, said conveyor borne circuit means sequentially establishing control circuits with said trackside circuit means as said collector means sequentially contacts said bus bar means, a voltage sensitive device and a voltage control device arranged in each of said sequentially established control circuits, one of said devices being included in said conveyor borne circuit means and the other of said devices being included one each in said plurality of trackside circuit means, said conveyor borne circuit means being adjustable to establish a control circuit in which said voltage sensitive device will operate only with the circuit means of a selected station, upon engagement of the collector means with the bus bar means of the selected station, said voltage sensitive device operating to control an operation affecting the conveyor at the selected station.

4. A conveyor for travelling along a trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar, control collector means carried by said conveyor and guided to engage said power bus bar substantially continuously and to engage said interposed bus bar means sequentially as the collector means travel, a plurality of distinguishable trackside circuit means located adjacent said stations and electrically connected to respective ones of said bus bar means, conveyor borne circuit means electrically connected to said collector means, said conveyor borne circuit means sequentially establishing control circuits with said trackside circuit means as said collector means sequentially contacts said bus bar means, a voltage sensitive device and a voltage control device arranged in each of said sequentially established control circuits, one of said devices being included in said conveyor borne circuit means and the other of said devices being included one each in said plurality of trackside circuit means, said conveyor borne circuit means being adjustable to establish a control circuit in which said voltage sensitive device will operate only with the circuit means of a selected station, upon engagement of the collector means with the bus bar means of the selected station, said voltage sensitive device operating to control an operation affecting the conveyor at the selected station.

5. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar, control collector means carried by said conveyor and guided to engage said power bus bar substantially continuously and to engage said interposed bus bar means sequentially as the collector means travel, a plurality of distinguishable trackside circuit means having differing voltage sensitivity characteristics located adjacent said stations and electrically connected to respective ones of said bus bar means, and conveyor borne voltage regulating means electrically connected to said collector means, said voltage regulating means being manually adjustable as to its voltage output to establish a responsive control circuit only with the trackside circuit means of a selected station, upon engagement of the collector means with the bus bar means of the selected station.

6. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar, control collector means carried by said conveyor and guided to engage said power bus bar substantially continuously and to engage said interposed bus bar means sequentially as the collector means travel, a plurality of distinguishable trackside circuit means having differing voltage sensitivity characteristics located adjacent said stations and electrically connected to respective ones of said bus bar means, conveyor borne voltage regulating means electrically connected to said collector means, said voltage regulating means being manually adjustable as to its voltage output to establish a responsive control circuit only with the trackside circuit means of a selected station, upon engagement of the collector means with the bus bar means of the selected station, and a translating device located on said conveyor and operable by said control circuit to control an operation affecting the conveyor at the selected station.

7. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar, control collector means carried by said conveyor and guided to engage said power bus bar substantially continuously and to engage said interposed bus bar means sequentially as the collector means travel, a plurality of distinguishable trackside circuit means having differing voltage sensitivity characteristics located adjacent said stations and electrically connected to respective ones of said bus bar means, conveyor borne voltage regulating means electrically connected to said collector means, said voltage regulating means being manually adjustable as to its voltage output to establish a responsive control circuit only with the trackside circuit means of a selected station, upon engagement of the collector means with the bus bar means of the selected station, and a plurality of translating devices located one each at the respective stations and operable by said control circuit to control an operation affecting the conveyor at the selected station.

8. A trackway, a conveyor for travelling along said trackway, a propulsion motor carried by said conveyor, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar, control collector means carried by said conveyor and guided to engage said power bus bar substantially continuously and to engage said interposed bus bar means sequentially as the collector means travel, a plurality of distinguishable trackside circuit means having differing voltage sensitivity characteristics located adjacent said stations and electrically connected to respective ones of said bus bar means, and conveyor borne voltage regulating means electrically connected to said collector means, said voltage regulating means being manually adjustable as to its voltage output to establish a responsive control circuit only with the trackside circuit means of a selected station, upon engagement of the collector means with the bus bar means of the selected station, said control circuit when responsive serving to interrupt the flow of electric power to said propulsion motor at the selected station.

9. A trackway, a conveyor for travelling along said trackway, a plurality of track switches in said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar, control collector means carried by said conveyor and guided to engage said power bus bar substantially continuously and to engage said interposed bus bar means sequentially as the collector means travel, a plurality of distinguishable trackside circuit means having differing voltage sensitivity characteristics located adjacent said stations and electrically connected to respective ones of said bus bar means, and conveyor borne voltage regulating means electrically connected to said collector means, said voltage regulating means being manually adjustable as to its voltage ouput to establish a responsive control circuit only with the trackside circuit means of a selected station, upon engagement of the collector means with the bus bar means of the selected station, said control circuit when responsive serving to operate the corresponding track switch at the selected station.

10. In a control system for a carrier operable over a predeterminable route having a plurality of stations distributed therealong, a control conductor having sections individual to said stations and extending along said route, control trolley means on said carrier engageable with said control conductor, said trolley means being common to said stations, a station selector on the carrier operable to selectively condition said control trolley means in accordance with the station selected, said station selector being operable, to select a station, at any time during the approach of said carrier to the selected station, carrier control means for each station connected to the corresponding section and disposed to be energized from said control trolley means as the carrier approaches the corresponding station, and means operably responsive to said energization to control the carrier at the selected station, said carrier control means each including voltage sensitive apparatus, and said station selector including means for impressing voltages on the carrier control means at a value corresponding to the value required to operate only the carrier control means at the station where it is desired to control the carrier.

References Cited in the file of this patent

UNITED STATES PATENTS

| Number | Name | Date |
|---|---|---|
| 494,111 | Miller et al. | Mar. 21, 1893 |
| 1,022,935 | Gattie et al. | Apr. 9, 1912 |
| 1,243,457 | Stuart | Oct. 16, 1917 |
| 1,381,317 | Loughridge | June 14, 1921 |
| 1,487,315 | Connely | Mar. 18, 1924 |
| 1,577,392 | Venables | Mar. 16, 1926 |
| 1,603,012 | Andrews | Oct. 12, 1926 |
| 1,661,744 | Wurst | Mar. 6, 1928 |
| 1,797,651 | Gergacsevics | Mar. 24, 1931 |
| 1,817,692 | Kloss et al. | Aug. 4, 1931 |
| 2,073,443 | Cardoza | Mar. 9, 1937 |
| 2,102,995 | Coombs | Dec. 21, 1937 |
| 2,254,285 | Harris et al. | Sept. 2, 1941 |
| 2,363,416 | Henroteau | Nov. 21, 1944 |
| 2,486,221 | Spafford | Oct. 25, 1949 |

FOREIGN PATENTS

| Number | Country | Date |
|---|---|---|
| 577,420 | Germany | May 31, 1933 |
| 382,973 | Great Britain | Nov. 10, 1932 |